(12) United States Patent
Gaither et al.

(10) Patent No.: US 12,187,275 B2
(45) Date of Patent: Jan. 7, 2025

(54) OBJECT MEASUREMENT SYSTEM FOR A VEHICLE

(71) Applicant: Toyota Motor Engineering & Manufacturing North America, Inc., Plano, TX (US)

(72) Inventors: Geoffrey David Gaither, Ann Arbor, MI (US); Allison McGowan, Ann Arbor, MI (US); Nathan Westover, New Hudson, MI (US)

(73) Assignees: TOYOTA MOTOR ENGINEERING & MANUFACTURING NORTH AMERICA, INC, Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 260 days.

(21) Appl. No.: 17/846,414

(22) Filed: Jun. 22, 2022

(65) Prior Publication Data
US 2023/0415737 A1     Dec. 28, 2023

(51) Int. Cl.
*B60W 30/00*    (2006.01)
*B60W 30/095*   (2012.01)

(52) U.S. Cl.
CPC ... *B60W 30/0956* (2013.01); *B60W 2530/201* (2020.02); *B60W 2552/00* (2020.02); *B60W 2552/50* (2020.02); *B60W 2554/20* (2020.02); *B60W 2556/45* (2020.02)

(58) Field of Classification Search
CPC ....... B60W 30/0956; B60W 2530/201; B60W 2552/00; B60W 2552/50; B60W 2554/20; B60W 2556/45; B60W 2556/40; B60W 2556/55; B60W 50/0097; B60W 2554/60; B60W 30/09
See application file for complete search history.

(56) References Cited

U.S. PATENT DOCUMENTS

| | | | |
|---|---|---|---|
| 10,190,357 B2 * | 1/2019 | Kothari | E05F 15/40 |
| 2015/0210312 A1 * | 7/2015 | Stein | B60W 30/14 |
| | | | 701/41 |
| 2016/0297360 A1 * | 10/2016 | Smyth | G08G 1/16 |
| 2018/0201260 A1 * | 7/2018 | Ichikawa | G01S 17/58 |
| 2020/0047667 A1 * | 2/2020 | Ji | B60Q 9/008 |

(Continued)

FOREIGN PATENT DOCUMENTS

| | | |
|---|---|---|
| CN | 109583321 A | 4/2019 |
| DE | 102018109680 A1 | 10/2019 |
| DE | 102019132012 A1 | 5/2021 |

OTHER PUBLICATIONS

Chacon, PJ et al. A Moving Vehicle Height Monitoring Sensor System for Overheight Impact Avoidance. Infrastructures. 2021; 6(6):91 [online], [retrieved on Apr. 20, 2024]. Retrived from the Internet <URL: https://doi.org/10.3390/infrastructures6060091> (Year: 2021).*

*Primary Examiner* — Peter D Nolan
*Assistant Examiner* — Peter Y Ning
(74) *Attorney, Agent, or Firm* — Jordan IP Law, LLC

(57) ABSTRACT

Vehicle systems, computer-implemented methods, and computer program products to enhance the situational competency and/or the safe operation of a vehicle by automatically controlling the vehicle in response to executing measurable attribute data analysis that includes a comparison of the relative height of a detected road infrastructure element with a predetermined threshold height value.

21 Claims, 9 Drawing Sheets

(56) References Cited

U.S. PATENT DOCUMENTS

| | | | |
|---|---|---|---|
| 2020/0156630 A1* | 5/2020 | Schmidt | B60W 30/0956 |
| 2020/0209857 A1* | 7/2020 | Djuric | B60W 60/0011 |
| 2021/0061273 A1* | 3/2021 | Poulin | H04W 4/021 |
| 2021/0303875 A1* | 9/2021 | Bangalore Ramaiah | G06V 20/58 |
| 2022/0017095 A1* | 1/2022 | Kourous-Harrigan | G07C 5/008 |
| 2022/0289237 A1* | 9/2022 | Vu | G01S 17/89 |
| 2023/0138848 A1* | 5/2023 | Larsson | B62D 15/025 701/41 |

* cited by examiner

OBJECT MEASUREMENT SYSTEM FOR A VEHICLE

TECHNICAL FIELD

One or more embodiments relate generally to vehicle systems, computer-implemented methods, and computer program products to enhance the situational competency and/or the safe operation of a vehicle by automatically controlling the vehicle in response to executing measurable attribute data analysis that includes a comparison of the relative height of a detected road infrastructure element with a predetermined threshold height value.

BACKGROUND

Contemporary vehicles are equipped with sensors that detect and respond to objects located at a particular height and distance from the vehicle. The sensing function, however, is momentary, is not recorded or learned, and does not function for the purpose of collision avoidance with smaller objects on the roadway path and also road infrastructure elements.

BRIEF SUMMARY

A user, operator, or driver of a vehicle may be unaware of the presence of a parking curb when placing the vehicle in reverse drive for purposes of parking the vehicle. This may cause the vehicle to contact the curve, causing damage to the vehicle (e.g., vehicle body, vehicle wheels, etc.) and/or to the parking curb. In another driving scenario, the user, operator, or driver of a vehicle may also be unaware, due to the current speed of the vehicle, of the presence of an overhead object (e.g., tree branches) or road infrastructure element (e.g., downed power lines, bridges, overpasses, etc.) when driving on a roadway. This may also cause the vehicle to contact the overhead object or road infrastructure element, causing damage to the vehicle.

Vehicle systems, computer-implemented methods, and computer program products are provided herein to enhance the situational competency and/or the safe operation of a vehicle by causing a dynamic detection of one or more measurable attributes of an object and/or road infrastructure element (e.g., on-road or overhead objects and on-ground road infrastructure) that are within a predetermined threshold distance of the vehicle, and then control the vehicle in response to executing the measurable attribute data analysis for purposes of crash avoidance.

Because state-of-the-art vehicles are generally equipped with a plurality of on-board sensors operable that perform a plurality of functions during operation of the vehicle, one or more example embodiments are to leverage the pre-existing on-board sensors to execute functions for the safety and security of a detected object, the vehicle, and contents within the vehicle.

In accordance with one or more embodiments, an example vehicle system may comprise one or more of the following: a non-transitory memory operatively coupled to one or more processors comprising a set of instructions executable by the one or more processors to cause the one or more processors to: dynamically execute, in response to acquiring wireless network data, stored data, and measurable attribute data that includes a relative height of a detected road infrastructure element relative to a roadway surface upon which the vehicle is traveling, a measurable attribute data analysis by comparing the relative height of the detected road infrastructure element with a predetermined threshold height; and automatically control the vehicle, in response to the measurable attribute data analysis.

In accordance with the example vehicle system, the detected road infrastructure element comprises fixed/stationary, physical assets, including but not limited to, the roadway surface, signage, drainage, bridges, parking curbs, etc.

In accordance with the example vehicle system, the one or more measurable attributes of the detected road infrastructure element is the length, height, width, and shape of the detected road infrastructure element.

In accordance with the example vehicle system, dynamically executing the measurable attribute data analysis comprises executing a calculation of a current surface area of the detected road infrastructure element. In accordance with the example vehicle system, prior to dynamically executing the measurable attribute data analysis, the set of instructions are executable by the one or more processors to cause the one or more processors to automatically cause a dynamic detection of, in an ambient environment of the vehicle, a presence of the road infrastructure element within a predetermined threshold distance of the vehicle.

In accordance with the example vehicle system, prior to dynamically executing the measurable attribute data analysis, the set of instructions are executable by the one or more processors to automatically cause a detection of one or more measurable attributes of the road infrastructure element as the measurable attribute sensor data.

In accordance with the example vehicle system, the predetermined threshold height corresponds to the vehicle height.

In accordance with the example vehicle system, the detected road infrastructure element comprises an overhead road infrastructure element.

In accordance with the example vehicle system, automatically controlling the vehicle comprises causing the vehicle to execute one or more vehicle driving maneuvers to avoid contact with the overhead road infrastructure element when the relative height of the overhead road infrastructure element is less than the vehicle height.

In accordance with the example vehicle system, the predetermined threshold height corresponds to the vehicle ground clearance. The ground clearance can be at a front region (e.g., front bumper or front spoiler) of the vehicle body and/or a rear region (e.g., rear bumper or rear spoiler) of the vehicle body.

In accordance with the example vehicle system, the detected road infrastructure element comprises an on-ground road infrastructure element.

In accordance with the example vehicle system, automatically controlling the vehicle comprises causing the vehicle to execute one or more vehicle driving maneuvers to avoid contact with the on-ground road infrastructure element when the relative height of the on-ground road infrastructure element is greater than the vehicle ground clearance.

In accordance with the example vehicle system, the one or more vehicle driving maneuvers comprises controlling the steering wheel of the vehicle.

In accordance with the example vehicle system, the one or more vehicle driving maneuvers comprises applying the vehicle brakes.

In accordance with the example vehicle system, the one or more vehicle driving maneuvers comprises decelerating the vehicle.

In accordance with the example vehicle system, the set of instructions are executable by the one or more processors to cause the one or more processors to store the detected measurable attribute data in memory.

In accordance with the example vehicle system, the set of instructions are executable by the one or more processors to cause the one or more processors to train a machine learning model of the vehicle in response to dynamically executing the measurable attribute data analysis.

In accordance with the example vehicle system, the set of instructions are executable by the one or more processors to cause the one or more processors to dynamically predict, via the trained machine learning model, a probability of contact between the vehicle and the detected road infrastructure element.

In accordance with the example vehicle system, in response to dynamically executing the measurable attribute data analysis, the set of instructions are executable by the one or more processors to cause the one or more processors to automatically transmit one or more of a visual alarm, an audio alarm, and a haptic alarm.

In accordance with one or more embodiments, an example computer-implemented method of operating a vehicle may comprise one or more of the following: dynamically executing, in response to acquiring wireless network data, stored data, and measurable attribute data that includes a relative height of a detected road infrastructure element relative to a roadway surface upon which the vehicle is traveling, and executing measurable attribute data analysis by comparing the relative height of the detected road infrastructure element with a predetermined threshold height; and automatically controlling the vehicle, in response to the measurable attribute data analysis.

In accordance with the example computer-implemented method, the detected road infrastructure element comprises fixed/stationary, physical assets, including but not limited to, the roadway surface, signage, drainage, bridges, parking curbs, etc.

In accordance with the example computer-implemented method, the one or more measurable attributes of the detected road infrastructure element is the length, height, width, and shape of the detected road infrastructure element.

In accordance with the example computer-implemented method, dynamically executing the measurable attribute data analysis comprises executing a calculation of a current surface area of the detected road infrastructure element.

In accordance with the example computer-implemented method, further comprising, prior to dynamically executing the measurable attribute data analysis, causing a dynamic detection of, in an ambient environment of the vehicle, a presence of the road infrastructure element within a predetermined threshold distance of the vehicle.

In accordance with the example computer-implemented method, further comprising, prior to dynamically executing the measurable attribute data analysis, causing a detection of one or more measurable attributes of the road infrastructure element as the measurable attribute sensor data.

In accordance with the example computer-implemented method, the predetermined threshold height corresponds to the vehicle height.

In accordance with the example computer-implemented method, the detected road infrastructure element comprises an overhead road infrastructure element.

In accordance with the example computer-implemented method, automatically controlling the vehicle comprises causing the vehicle to execute one or more vehicle driving maneuvers to avoid contact with the overhead road infrastructure element when the relative height of the overhead road infrastructure element is less than the vehicle height.

In accordance with the example computer-implemented method, the predetermined threshold height corresponds to the vehicle ground clearance. The ground clearance can be at a front region (e.g., front bumper or front spoiler) of the vehicle body and/or a rear region (e.g., rear bumper or rear spoiler) of the vehicle body.

In accordance with the example computer-implemented method, the detected road infrastructure element comprises an on-ground road infrastructure element.

In accordance with the example computer-implemented method, automatically controlling the vehicle comprises causing the vehicle to execute one or more vehicle driving maneuvers to avoid contact with the on-ground road infrastructure element when the relative height of the on-ground road infrastructure element is greater than the vehicle ground clearance.

In accordance with the example computer-implemented method, the one or more vehicle driving maneuvers comprises controlling the steering wheel of the vehicle.

In accordance with the example computer-implemented method, the one or more vehicle driving maneuvers comprises applying the vehicle brakes.

In accordance with the example computer-implemented method, the one or more vehicle driving maneuvers comprises decelerating the vehicle.

In accordance with the example computer-implemented method, further comprising storing the detected measurable attribute data in memory.

In accordance with the example computer-implemented method, further comprising training a machine learning model of the vehicle in response to storing the detected measurable attribute data.

In accordance with the example computer-implemented method, further comprising dynamically predicting, via the trained machine learning model, a probability of contact between the vehicle and the detected road infrastructure element.

In accordance with the example computer-implemented method, further comprising, in response to dynamically executing the measurable attribute data analysis, automatically transmitting one or more of a visual alarm, an audio alarm, and a haptic alarm.

In accordance with one or more embodiments, an example computer program product including at least one computer readable medium, comprising a set of instructions, which when executed by one or more processors, cause the one or more processors to execute one or more of the following: dynamically execute, in response to acquiring wireless network data, stored data, and measurable attribute data that includes a relative height of a detected road infrastructure element relative to a roadway surface upon which the vehicle is a measurable attribute data analysis by comparing the relative height of the detected road infrastructure element with a predetermined threshold height; and automatically control the vehicle, in response to the measurable attribute data analysis.

In accordance with the example computer program product, the detected road infrastructure element comprises fixed/stationary, physical assets, including but not limited to, the roadway surface, signage, drainage, bridges, parking curbs, etc.

In accordance with the example computer program product, the one or more measurable attributes of the detected road infrastructure element is the length, height, width, and shape of the detected road infrastructure element.

In accordance with the example computer program product, dynamically executing the measurable attribute data analysis comprises executing a calculation of a current surface area of the detected road infrastructure element.

In accordance with the example computer program product, prior to dynamically executing the measurable attribute data analysis, the set of instructions are executable by the one or more processors to cause the one or more processors to automatically cause a dynamic detection of, in an ambient environment of the vehicle, a presence of the road infrastructure element within a predetermined threshold distance of the vehicle.

In accordance with the example computer program product, prior to dynamically executing the measurable attribute data analysis, the set of instructions are executable by the one or more processors to automatically cause a detection of one or more measurable attributes of the road infrastructure element as the measurable attribute sensor data.

In accordance with the example computer program product, the predetermined threshold height corresponds to the vehicle height.

In accordance with the example computer program product, the detected road infrastructure element comprises an overhead road infrastructure element.

In accordance with the example computer program product, automatically controlling the vehicle comprises causing the vehicle to execute one or more vehicle driving maneuvers to avoid contact with the overhead road infrastructure element when the relative height of the overhead road infrastructure element is less than the vehicle height.

In accordance with the example computer program product, the predetermined threshold height corresponds to the vehicle ground clearance. The ground clearance can be at a front region (e.g., front bumper or front spoiler) of the vehicle body and/or a rear region (e.g., rear bumper or rear spoiler) of the vehicle body.

In accordance with the example computer program product, the detected road infrastructure element comprises an on-ground road infrastructure element.

In accordance with the example computer program product, automatically controlling the vehicle comprises causing the vehicle to execute one or more vehicle driving maneuvers to avoid contact with the on-ground road infrastructure element when the relative height of the on-ground road infrastructure element is greater than the vehicle ground clearance.

In accordance with the example computer program product, the one or more vehicle driving maneuvers comprises controlling the steering wheel of the vehicle.

In accordance with the example computer program product, the one or more vehicle driving maneuvers comprises applying the vehicle brakes.

In accordance with the example computer program product, the one or more vehicle driving maneuvers comprises decelerating the vehicle.

In accordance with the example computer program product, the set of instructions are executable by the one or more processors to cause the one or more processors to store the detected measurable attribute data in memory.

In accordance with the example computer program product, the set of instructions are executable by the one or more processors to cause the one or more processors to train a machine learning model of the vehicle in response to dynamically executing the measurable attribute data analysis.

In accordance with the example computer program product, the set of instructions are executable by the one or more processors to cause the one or more processors to dynamically predict, via the trained machine learning model, a probability of contact between the vehicle and the detected road infrastructure element.

In accordance with the example computer program product, in response to dynamically executing the measurable attribute data analysis, the set of instructions are executable by the one or more processors to cause the one or more processors to automatically transmit one or more of a visual alarm, an audio alarm, and a haptic alarm.

In accordance with one or more embodiments, an example vehicle may comprise one or more of the following: a non-transitory memory operatively coupled to one or more processors comprising a set of instructions executable by the one or more processors to cause the one or more processors to: dynamically execute, in response to acquiring wireless network data, stored data, and measurable attribute data that includes a relative height of a detected road infrastructure element relative to a roadway surface upon which the vehicle is traveling, measurable attribute data analysis by comparing the relative height of the detected road infrastructure element with a predetermined threshold height; and automatically control the vehicle, in response to the measurable attribute data analysis.

In accordance with the example vehicle, the detected road infrastructure element comprises fixed/stationary, physical assets, including but not limited to, the roadway surface, signage, drainage, bridges, parking curbs, etc.

In accordance with the example vehicle, the one or more measurable attributes of the detected road infrastructure element is the length, height, width, and shape of the detected road infrastructure element.

In accordance with the example vehicle, dynamically executing the measurable attribute data analysis comprises executing a calculation of a current surface area of the detected road infrastructure element.

In accordance with the example vehicle, prior to dynamically executing the measurable attribute data analysis, the set of instructions are executable by the one or more processors to cause the one or more processors to automatically cause a dynamic detection of, in an ambient environment of the vehicle, a presence of the road infrastructure element within a predetermined threshold distance of the vehicle.

In accordance with the example vehicle, prior to dynamically executing the measurable attribute data analysis, the set of instructions are executable by the one or more processors to automatically cause a detection of one or more measurable attributes of the road infrastructure element as the measurable attribute sensor data.

In accordance with the example vehicle, the predetermined threshold height corresponds to the vehicle height.

In accordance with the example vehicle, the detected road infrastructure element comprises an overhead road infrastructure element.

In accordance with the example vehicle, automatically controlling the vehicle comprises causing the vehicle to execute one or more vehicle driving maneuvers to avoid contact with the overhead road infrastructure element when the relative height of the overhead road infrastructure element is less than the vehicle height.

In accordance with the example vehicle, the predetermined threshold height corresponds to the vehicle ground clearance. The ground clearance can be at a front region (e.g., front bumper or front spoiler) of the vehicle body and/or a rear region (e.g., rear bumper or rear spoiler) of the vehicle body. In accordance with the example vehicle, the detected road infrastructure element comprises an on-ground road infrastructure element.

In accordance with the example vehicle, automatically controlling the vehicle comprises causing the vehicle to execute one or more vehicle driving maneuvers to avoid contact with the on-ground road infrastructure element when the relative height of the on-ground road infrastructure element is greater than the vehicle ground clearance.

In accordance with the example vehicle, the one or more vehicle driving maneuvers comprises controlling the steering wheel of the vehicle.

In accordance with the example vehicle, the one or more vehicle driving maneuvers comprises applying the vehicle brakes.

In accordance with the example vehicle, the one or more vehicle driving maneuvers comprises decelerating the vehicle.

In accordance with the example vehicle, the set of instructions are executable by the one or more processors to cause the one or more processors to store the detected measurable attribute data in memory.

In accordance with the example vehicle, the set of instructions are executable by the one or more processors to cause the one or more processors to train a machine learning model of the vehicle in response to dynamically executing the measurable attribute data analysis.

In accordance with the example vehicle, the set of instructions are executable by the one or more processors to cause the one or more processors to dynamically predict, via the trained machine learning model, a probability of contact between the vehicle and the detected road infrastructure element.

In accordance with the example vehicle, in response to dynamically executing the measurable attribute data analysis, the set of instructions are executable by the one or more processors to cause the one or more processors to automatically transmit one or more of a visual alarm, an audio alarm, and a haptic alarm.

BRIEF DESCRIPTION OF THE SEVERAL VIEWS OF THE DRAWINGS

The various advantages of the exemplary embodiments will become apparent to one skilled in the art by reading the following specification and appended claims, and by referencing the following drawings, in which:

DETAILED DESCRIPTION

Figure 1:
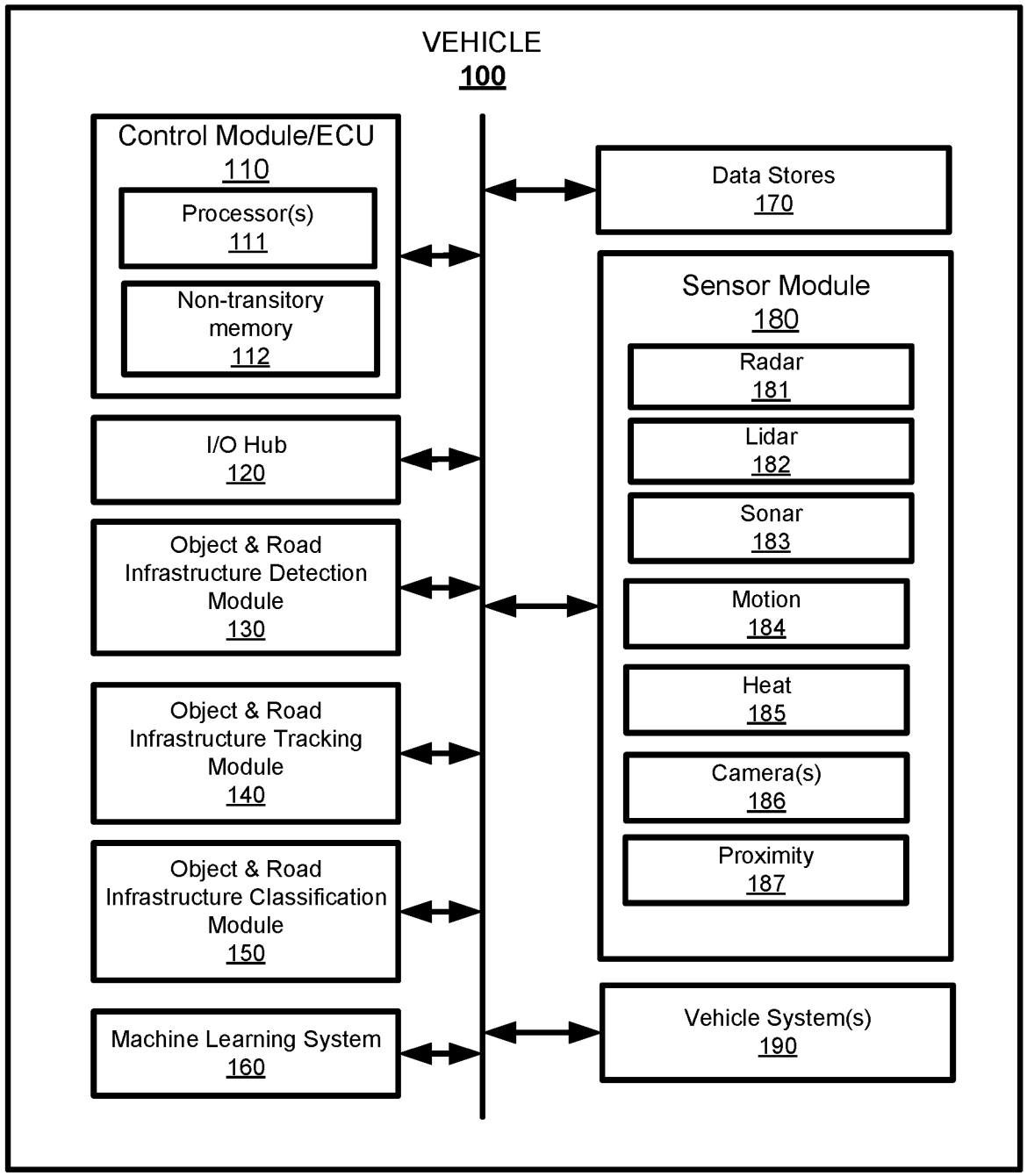
FIG. 1 illustrates an example of a vehicle, in accordance with one or more embodiments shown and described herein.

Turning to the figures, in which FIG. 1 illustrates a vehicle 100, in accordance with one or more embodiments. In accordance with one or more embodiments, a "vehicle" may be in reference to any form of motorized transport. In accordance with one or more embodiments, the vehicle 100 may comprise an automobile. Embodiments, however, are not limited thereto, and thus, the vehicle 100 may comprise a watercraft, an aircraft, or any other form of transport vehicle.

In accordance with one or more embodiments, the vehicle 100 may comprise an electric vehicle (EV), a hybrid electric vehicle (HEV), a plug-in hybrid electric vehicle (PHEV), a battery electric vehicle (BEV), and a fuel cell electric vehicle (FCEV).

In accordance with one or more embodiments, the vehicle 100 may comprise an autonomous vehicle. As described herein, an "autonomous vehicle" may comprise a vehicle that is configured to operate in an autonomous mode. As set forth, described, and/or illustrated herein, "autonomous mode" means that one or more computing systems are used to operate, and/or navigate, and/or maneuver the vehicle along a travel route with minimal or no input from a human driver. In accordance with one or more embodiments, the vehicle 100 may be configured to be selectively switched between an autonomous mode and a manual mode. Such switching may be implemented in any suitable manner (now known or later developed). As set forth, described, and/or illustrated herein, "manual mode" means that operation, and/or navigation, and/or maneuvering of the vehicle along a travel route, may, either in whole or in part, is to be performed by a human driver. As set forth, described, and/or illustrated herein, "vehicle height" means the height of the vehicle that is measured from the lowest point of the vehicle, (i.e., the point where the vehicle tires touch the roadway surface) to the highest point on the vehicle (e.g., the vehicle roof). As set forth, described, and/or illustrated herein, "ground clearance" means the distance between the lowest part of the vehicle undercarriage and the roadway surface.

In accordance with one or more embodiments, the vehicle 100 may comprise one or more operational elements, some of which may be a part of an autonomous driving system. Some of the possible operational elements of the vehicle 100 are shown in FIG. 1 and will now be described. It will be understood that it is not necessary for the vehicle 100 to have all the elements illustrated in FIG. 1 and/or described herein. The vehicle 100 may have any combination of the various elements illustrated in FIG. 1. Moreover, the vehicle 100 may have additional elements to those illustrated in FIG. 1.

In accordance with one or more embodiments, the vehicle 100 may not include one or more of the elements shown in FIG. 1. Moreover, while the various operational elements are illustrated as being located within the vehicle 100, embodiments are not limited thereto, and thus, one or more of the operational elements may be located external to the vehicle 100, and even physically separated by large spatial distances.

In accordance with one or more embodiments, the example vehicle 100 comprises a control module/electronic control unit (ECU) 110, an I/O hub 120, an object and road infrastructure detection module 130, an object tracking module 140, an object classification module 150, a machine learning (ML) system 160, one or more data stores 170, a sensor module 180, and one or more vehicle systems 190.

The control module/ECU 110 comprises one or more processors 111 and a non-transitory memory 112 operatively coupled to the one or more processors 111 comprising a set of instructions executable by the one or more processors 111 to cause the one or more processors 111 to execute one or more one or more instructions to control various operational systems, subsystems, and components of the vehicle 100. In accordance with one or more embodiments set forth, described, and/or illustrated herein, "processor" means any component or group of components that are configured to execute any of the processes described herein or any form of instructions to carry out such processes or cause such processes to be performed. The one or more processors 111 may be implemented with one or more general-purpose and/or one or more special-purpose processors. Examples of suitable processors include graphics processors, microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The one or more processors 111 may comprise at least one hardware circuit (e.g., an integrated circuit) configured to carry out one or more instructions contained in program code. In embodiments in which there is a plurality of processors 111, such processors 111 may work independently from each other, or one or more processors 111 in the plurality may work in combination with each other. In one or more embodiments, the one or more processors 111 may be a host, main, or primary processor of the vehicle 100.

The I/O hub 120 may be operatively connected to other systems, subsystems, and components of the vehicle 100. The I/O hub 120 may comprise an input interface and an output interface. The input interface and the output interface may be integrated as a single, unitary interface, or alternatively, be separate as independent interfaces that are operatively connected.

Figure 5:
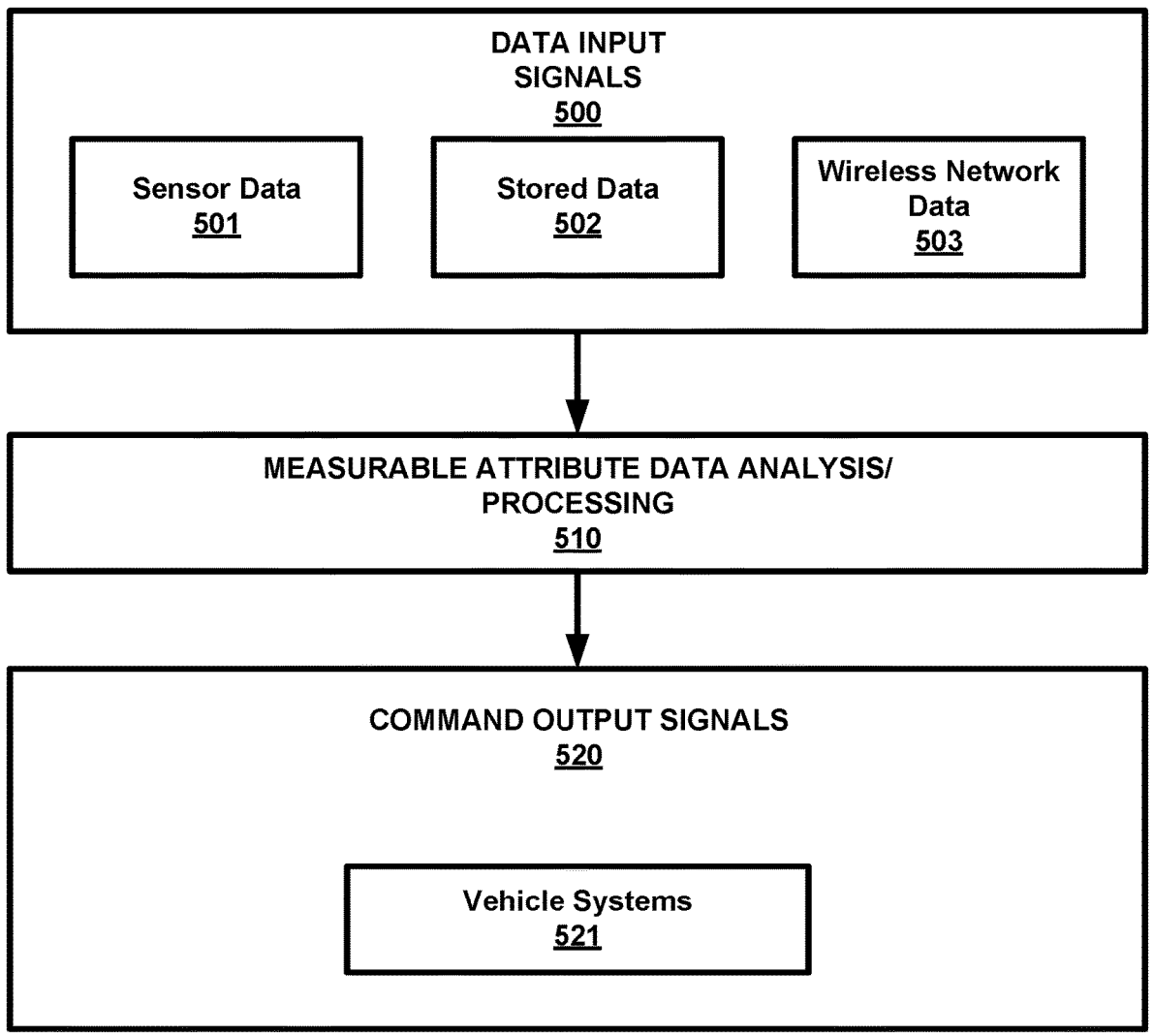
FIG. 5 illustrates a block diagram of one or more vehicle control blocks of an example vehicle system of the vehicle of FIG. 1.

In accordance with one or more embodiments, the input interface may be used by a user, such as, for example, a user, operator (including remote operator), or driver of the vehicle 100, to input a user-selected input data that is then stored in memory as stored data 502 (See FIG. 5) to be stored in the one or more data stores 170 and/or accessible by the non-transitory memory 112.

The input interface is defined herein as any device, component, system, subsystem, element, or arrangement or groups thereof that enable information/data to be entered in a machine. The input interface may receive or otherwise acquire an input from the user, operator, or driver of the vehicle 100. In accordance with one or more example embodiments, the input interface may comprise a user interface (UI), graphical user interface (GUI) such as, for example, a display, human-machine interface (HMI), or the like. Embodiments, however, are not limited thereto, and thus, this disclosure contemplates the input interface comprising any suitable configuration that falls within the spirit and scope of the principles of this disclosure. For example, the input interface may comprise a keypad, toggle switch, touch screen, multi-touch screen, button, joystick, mouse, trackball, microphone and/or combinations thereof.

The output interface is defined herein as any device, component, system, subsystem, element, or arrangement or groups thereof that enable information/data to be presented to the vehicle operator and/or a remote operator of the vehicle 100. The output interface may be operable to present information/data to the vehicle occupant and/or the remote operator. The output interface may comprise one or more of a visual display or an audio display such as a microphone, earphone, and/or speaker. One or more components of the vehicle 100 may serve as both a component of the input interface and a component of the output interface.

The one or more data stores 170 are configured to store one or more types of data. The vehicle 100 may include interfaces that enable one or more systems thereof to manage, retrieve, modify, add, or delete, the data stored in the data stores 170. The one or more data stores 170 may comprise volatile and/or non-volatile memory. Examples of suitable data stores 170 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The one or more data stores 170 may be a component of the one or more processors 111, or alternatively, may be operatively connected to the one or more processors 111 for use thereby. As set forth, described, and/or illustrated herein, "operatively connected" may include direct or indirect connections, including connections without direct physical contact.

The sensor module 180 is operable, at least during operation of the vehicle 100, to dynamically detect, determine, assess, monitor, measure, quantify, and/or sense information about the vehicle 100 and an ambient or external environment of the vehicle 100. As set forth, described, and/or illustrated herein, "sensor" means any device, component and/or system that can perform one or more of detecting, determining, assessing, monitoring, measuring, quantifying, and sensing something. The one or more sensors may be configured to detect, determine, assess, monitor, measure, quantify and/or sense in real-time. As set forth, described, and/or illustrated herein, "real-time" means a level of processing responsiveness that a user or system senses as sufficiently immediate for a particular process or determination to be made, or that enables the processor to keep up with some external process.

The sensor module 180 may comprise for example, one or more sensors operable to detect, determine, assess, monitor, measure, quantify, and/or sense objects and road infrastructure elements in the ambient environment of the vehicle 100. The sensors include, but not limited to ranging sensors (e.g., light detection and ranging, radio detection and ranging/radar, sound navigation and ranging/sonar), depth sensors, and image sensors (e.g., red, green, blue/RGB camera, multi-spectral infrared/IR camera). In the illustrated example of FIG. 1, the sensor module 180 comprises a radar sensor 181, a lidar sensor 182, a sonar sensor 183, a motion sensor 184, a heat sensor 185, one or more cameras 186, and one or more proximity sensors 187. It will be understood that the embodiments are not limited to the particular sensors described herein.

The one or more sensors 181-187 may be configured to detect, determine, assess, monitor, measure, quantify, and/or sense information about the ambient environment in which the vehicle 100 is operating, including information about objects and road infrastructure elements in the ambient environment. Such objects may include, but is not limited to, objects that are spatially on, above, and/or over the roadway path, e.g., animals, tires, debris, rocks, and pedestrians. Such road infrastructure elements may include, but is not limited to, fixed, physical assets, the roadway surface, signage, drainage, bridges, parking curbs, etc. In one or more example embodiments, detection of objects and road infrastructure elements in the ambient environment may come from one or more You Only Look Once (YOLO) detectors or one or more Single Shot Detectors (SSD).

The sensor module 180 and/or the one or more sensors 181-187 may be operatively connected to the control module/ECU 110, the one or more data stores 170, and/or other elements, components, systems, subsystems, and modules of the vehicle 100. The sensor module 180 and/or any of the one or more sensors 181-187 described herein may be provided or otherwise positioned in any suitable location with respect to the vehicle 100. For example, one or more of the sensors 181-187 may be located within the vehicle 100, one or more of the sensors 181-187 may be located on the exterior of the vehicle 100, one or more of the sensors 181-187 may be located to be exposed to the exterior of the vehicle 100, and/or one or more of the sensors 181-187 may be located within a component of the vehicle 100. The one or more sensors 181-187 may be provided or otherwise positioned in any suitable that permits practice of the one or more embodiments.

In accordance with one or more embodiments, the one or more sensors 181-187 may work independently from each other, or alternatively, may work in combination with each other. The sensors 181-187 may be used in any combination, and may be used redundantly to validate and improve the accuracy of the detection.

In accordance with one or more embodiments, the sensor module 180 may comprise one or more radar sensors 181. As set forth, described, and/or illustrated herein, "radar sensor" means any device, component and/or system that can detect, determine, assess, monitor, measure, quantify, and/or sense something using, at least in part, radio signals. The one or more radar sensors 181 may be configured to detect, determine, assess, monitor, measure, quantify, and/or sense, directly or indirectly, the presence of objects and road infrastructure elements in the ambient environment of the vehicle 100, the relative position of each detected object and road infrastructure elements relative to the vehicle 100, the spatial distance between the vehicle 100 and each detected object and each road infrastructure element in one or more directions (e.g., in a longitudinal direction, a lateral direction, and/or other direction(s)), the spatial distance between each detected object and road infrastructure elements and other detected objects and detected road infrastructure element in one or more directions (e.g., in a longitudinal direction, a lateral direction, and/or other direction(s)), a current speed of each detected object and road infrastructure element, and/or the movement of each detected object and road infrastructure element.

In accordance with one or more embodiments, the sensor module 180 may comprise one or more lidar sensors 182. As set forth, described, and/or illustrated herein, "lidar sensor" means any device, component and/or system that can detect, determine, assess, monitor, measure, quantify, and/or sense something using at least in part lasers. Such devices may comprise a laser source and/or laser scanner configured to transmit a laser and a detector configured to detect reflections of the laser. The one or more lidar sensors 182 may be configured to operate in a coherent or an incoherent detection mode. The one or more lidar sensors 182 may comprise high resolution lidar sensors.

The one or more lidar sensors 182 may be configured to detect, determine, assess, monitor, measure, quantify and/or sense, directly or indirectly, the presence of objects and road infrastructure elements in the ambient environment of the vehicle 100, the position of each detected object and detected road infrastructure element relative to the vehicle 100, the spatial distance between the vehicle 100 and each detected object and detected road infrastructure element in one or more directions (e.g., in a longitudinal direction, a lateral direction and/or other direction(s)), the elevation of each detected object and detected road infrastructure element, the spatial distance between each detected object and other detected objects and each detected road infrastructure element and other detected road infrastructure elements in one or more directions (e.g., in a longitudinal direction, a lateral direction, and/or other direction(s)), the speed of each detected object and detected road infrastructure element, and/or the movement of each detected object and detected road infrastructure element, the current speed of each detected object and detected road infrastructure element, and/or the movement of each detected object and detected road infrastructure element. The one or more lidar sensors 182 may generate a three-dimensional (3D) representation (e.g., image) of each detected object and detected road infrastructure element that may be used to compare to representations of known object types and known road infrastructure element types via the one or more data stores 170. Alternatively or additionally, data acquired by the one or more lidar sensors 182 may be processed to determine such things.

In accordance with one or more embodiments, the sensor module 180 may comprise one or more image devices such as, for example, one or more cameras 186. As set forth, described, and/or illustrated herein, "camera" means any device, component, and/or system that can capture visual data. Such visual data may include one or more of video information/data and image information/data. The visual data may be in any suitable form. The one or more cameras 186 may comprise high resolution cameras. The high resolution can refer to the pixel resolution, the spatial resolution, spectral resolution, temporal resolution, and/or radiometric resolution.

In accordance with one or more embodiments, the one or more cameras 186 may comprise high dynamic range (HDR) cameras or infrared (IR) cameras. One or more of the cameras 186 may comprise a lens and an image capture element. The image capture element may be any suitable type of image capturing device or system, including, for example, an area array sensor, a charge coupled device (CCD) sensor, a complementary metal oxide semiconductor (CMOS) sensor, a linear array sensor, and/or a CCD (monochrome). The image capture element may capture images in any suitable wavelength on the electromagnetic spectrum. The image capture element may capture color images and/or grayscale images. The one or more of the cameras 186 may be configured with zoom in and/or zoom out capabilities. The one or more cameras 186 may be spatially oriented, positioned, configured, operable, and/or arranged to capture visual data from at least a portion of the ambient environment of the vehicle 100, and/or any suitable portion within or external to the body of the vehicle 100. For instance, one or more of the cameras 186 may be located within the passenger cabin of the vehicle 100 or on external surface of the vehicle 100.

In accordance with one or more embodiments, the one or more cameras 186 may be fixed in a position that does not change relative to the vehicle 100. Alternatively or additionally, one or more of the cameras 186 may be movable so that its position can change relative to the vehicle 100 in a manner which facilitates the capture of visual data from different portions of the ambient environment of the vehicle 100. Such movement of the one or more cameras 186 may be achieved in any suitable manner, such as, for example, by rotation (about one or more rotational axes), by pivoting (about a pivot axis), by sliding (along an axis), and/or by extending (along an axis). The one or more cameras 186 (and/or the movement thereof) may be controlled by one or more of the control module/ECU 110, the sensor module 180, and any one or more of the modules, systems, and subsystems set forth, described, and/or illustrated herein.

In accordance with one or more embodiments, the one or more proximity sensors 187 may be configured to detect, determine, assess, monitor, measure, quantify, and/or sense, directly or indirectly, the relative spatial distance between the vehicle 100 and detected objects and detected road infrastructure elements in the ambient environment of the vehicle 100 in one or more directions (e.g., in a longitudinal direction, a lateral direction, and/or other direction(s)). The one or more proximity sensors 187 may be spatially oriented, positioned, configured, operable, and/or arranged to detect, determine, assess, monitor, measure, quantify, and/or sense, directly or indirectly, the relative spatial distance data. For instance, one or more of the proximity sensors 187 may be located within the passenger cabin of the vehicle 100 or on external surface of the vehicle 100.

In accordance with one or more embodiments, the control module/ECU 110 may be operable to dynamically transmit video or image data of detected objects and detected road infrastructure elements (e.g., via a software application) to the user, operator (including remote operator), or driver of the vehicle 100 for purposes of crash avoidance. In such a circumstance, the user, operator (including remote operator), or driver may manually implement one or more driving maneuvers based on the transmitted video or image data. Such driving maneuvers may be recommended by the control module/ECU 110 and visually presented to the user, operator (including remote operator), or driver via the output interface of the I/O hub 120.

Figure 2:
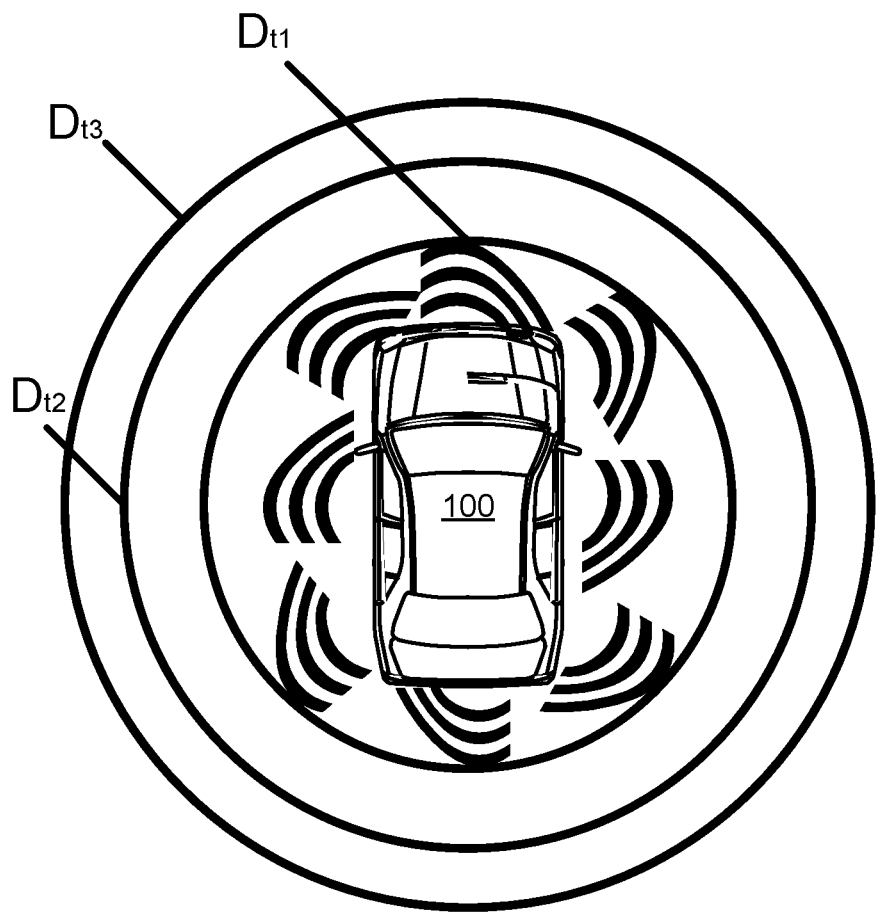
FIG. 2 illustrates the vehicle of FIG. 1 in an ambient environment.
Figure 3:
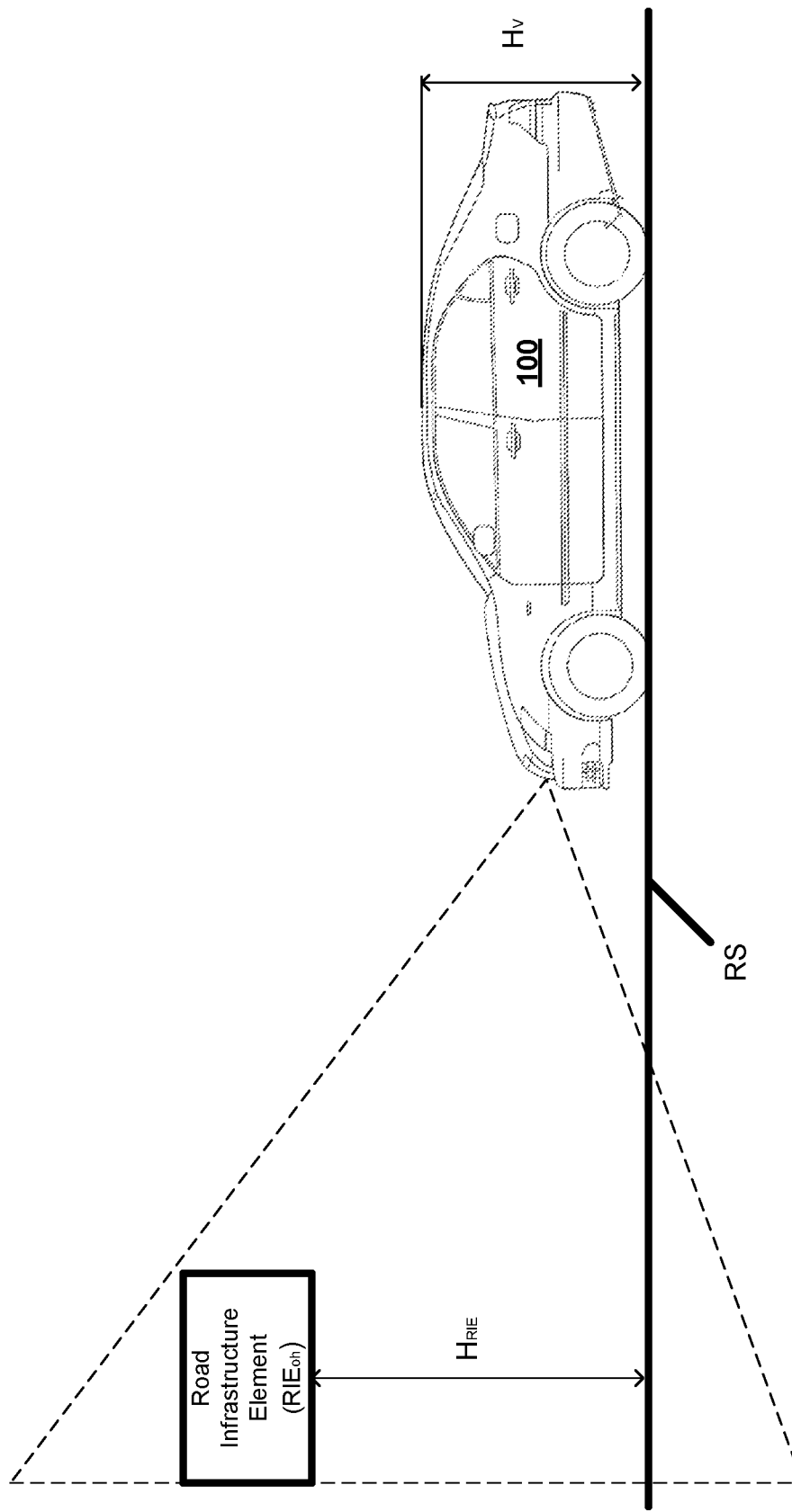
FIG. 3 illustrates the vehicle of FIG. 1 detecting an overhead road infrastructure element in an ambient environment.
Figure 4:
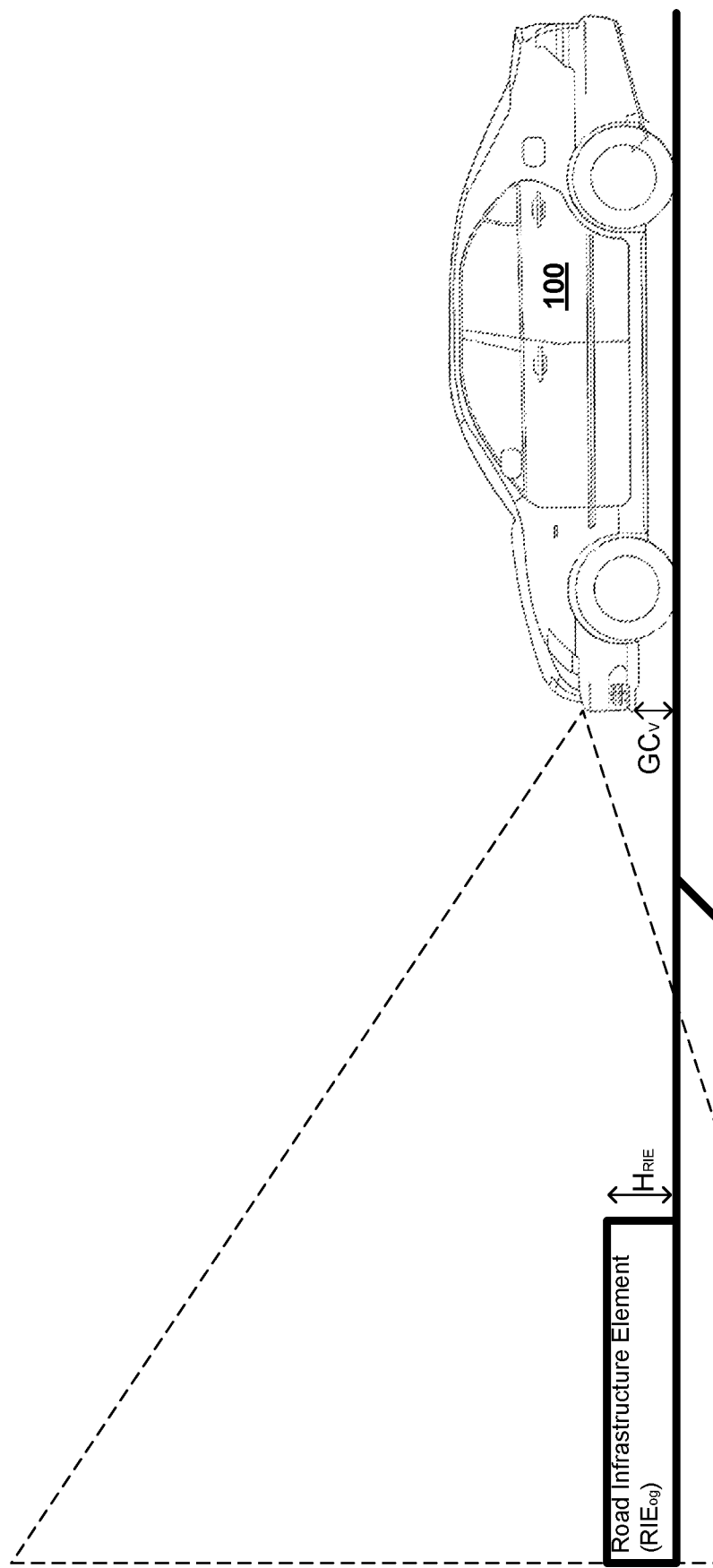
FIG. 4 illustrates the vehicle of FIG. 1 detecting an on-ground road infrastructure element in an ambient environment.

During operation of the vehicle 100, the one or more processor(s) 111 may be configured to select one or more of the sensors 181-187 to dynamically detect, determine, assess, monitor, measure, quantify, and/or sense the ambient environment within a predetermined threshold distance Dt1, Dt2, Dt3 from the vehicle 100 (See, FIG. 2). Such predetermined threshold distance Dt1, Dt2, Dt3 may be user-selected by a user, operator (including remote operator), or driver of the vehicle 100, and stored in the non-transitory memory 112 and/or one or more data stores 170.

In accordance with one or more embodiments, the vehicle 100 may comprise an object and road infrastructure detection module 130. The object and road infrastructure detection module 130 may be implemented as computer readable program code that, when executed by a processor, implement one or more of the various processes set forth, described, and/or illustrated herein, including, for example, to detect objects and road infrastructure elements in the ambient environment that are within the predetermined threshold distance Dt1, Dt2, Dt3 from the vehicle 100. The object and road infrastructure detection module 130 may be a component of the control module/ECU 110, or alternatively, may be executed on and/or distributed among other processing systems to which the control module/ECU 110 is operatively connected. The object and road infrastructure detection module 130 may include a set of logic instructions executable by the control module/ECU 110. Alternatively or additionally, the one or more data stores 170 may contain such logic instructions. The logic instructions may include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

The detection of objects and road infrastructure elements may be performed in any suitable manner. For instance, the detection may be performed using data acquired by the sensor module 180.

In accordance with one or more embodiments, should any objects and road infrastructure elements be detected, the object and road infrastructure detection module 130 may also identify or classify the detected objects. The object and road infrastructure detection module 130 can attempt to classify the objects and road infrastructure elements by accessing measurable attribute data (e.g., image, height, width, etc.) of roadway objects and measurable attribute data (e.g., image, height, width, shape, etc.) of road infrastructure elements located in an object and road infrastructure element database of the one or more data stores 170 or an external source (e.g., cloud-based data stores). The detected one or more objects and detected road infrastructure elements may be classified based on a comparison of the detected measurable attribute with stored data in the one or more data stores 170.

In accordance with one or more embodiments, the object and road infrastructure detection module 130 may also include any suitable object and road infrastructure recognition software configured to analyze the sensor data captured by the sensor module 180. The object and road infrastructure recognition software may query an object and road infrastructure database for possible matches. For instance, images captured by the sensor module 180 may be compared to images located in the object and road infrastructure database for possible matches. Alternatively or additionally, measurements or other aspects of an image captured by sensor module 180 may be compared to measurements or other aspects of images located in the object and road infrastructure database.

The object and road infrastructure detection module 130 may identify the detected objects and road infrastructure elements as a particular type of object and road infrastructure element should there be one or more matches between the captured image(s) and an image located in the object database. As set forth, described, and/or illustrated herein, a "match" or "matches" means that measurable attribute data collected by the sensor module 180 and the stored data located in the object and road infrastructure database are substantially identical. For example, an image or other information collected by the sensor module 180 and one or more of the images in the object and road infrastructure database may match within a predetermined threshold probability or confidence level.

In accordance with one or more embodiments, the vehicle 100 may comprise an object and road infrastructure tracking module 140. The object and road infrastructure tracking module 140 may be implemented as computer readable program code that, when executed by a processor, implements one or more of the various processes set forth, described, and/or illustrated herein, including, to one or more of follow, observe, watch, and track the movement of objects and road infrastructure elements over a plurality of sensor observations. As set forth, described, and/or illustrated herein, "sensor observation" means a moment of time or a period of time in which the one or more sensors 181-187 of the sensor module 180 are used to acquire measurable attribute data of at least a portion of an ambient environment within the predetermined threshold distance Dt1, Dt2, Dt3 from the vehicle 100. The object and road infrastructure tracking module 140 may be a component of the control module/ECU 110, or alternatively, may be executed on and/or distributed among other processing systems to which the control module/ECU 110 is operatively connected. The object and road infrastructure tracking module 140 may comprise logic instructions executable by the control module/ECU 110. Alternatively or additionally, the one or more data stores 170 may contain such logic instructions. The logic instructions may include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

The object and road infrastructure tracking module 140 and/or the control module/ECU 110 may be operable cause the dynamic tracking of detected objects and road infrastructure elements that are within the predetermined threshold distance Dt1, Dt2, Dt3 from the vehicle 100. Such tracking of objects and road infrastructure elements may occur over a plurality of sensor detection moments or frames.

In accordance with one or more embodiments, the vehicle 100 may comprise an object and road infrastructure classification module 150. The object and road infrastructure classification module 150 may be implemented as computer readable program code that, when executed by a processor, implements one or more of the various processes set forth, described, and/or illustrated herein, including, for example, to classify objects and road infrastructure elements in the ambient environment. The object and road infrastructure classification module 150 may be a component of the control module/ECU 110, or alternatively, may be executed on and/or distributed among other processing systems to which the control module/ECU 110 is operatively connected. The object and road infrastructure classification module 150 may comprise logic instructions executable by the control module/ECU 110. Alternatively or additionally, the one or more data stores 170 may contain such logic instructions. The logic instructions may include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

In accordance with one or more embodiments, the object and road infrastructure classification module 150 may be configured to detect, determine, assess, measure, quantify and/or sense, object types and road infrastructure element types of the detected objects and road infrastructure elements that are within the predetermined threshold distance Dt1, Dt2, Dt3 from the vehicle 100 based on one or more measurable attributes. The object and road infrastructure classification module 150 may be configured to classify the type of detected objects and detected road infrastructure elements according to one or more defined object classifications and road infrastructure elements classifications stored in the one or more data stores 170. For example, the object classification includes, but is not limited to, animals, trees tires, debris, rocks, pedestrians, etc. The infrastructure elements classification includes, but is not limited to, roadway surface, signage, drainage, bridges, parking curbs, etc.

In accordance with one or more embodiments, one or more of the modules 130, 140, 150, and 180 set forth, described, and/or illustrated herein may include artificial or computational intelligence elements, e.g., neural network, fuzzy logic, or other machine learning algorithms.

In accordance with one or more embodiments, the vehicle 100 may comprise machine learning (ML) system 160. As set forth, described, or illustrated herein, machine learning means computers and/or systems having an ability to learn without being explicitly programmed. Machine learning algorithms may be used to train one or more machine learning models of the vehicle 100 based on the measurable attribute data that is received or otherwise acquired via the one or more of the processors 111 of the control module/ECU 110, the one or more data stores 170, the sensor module 180, the vehicle system, 110, and any other input sources (including external input resources). The ML algorithms may include one or more of a linear regression algorithm, a logical regression algorithm, or a combination of different algorithms. A neural network may also be used to train the system based on the acquired data. The ML system 160 may analyze the acquired information or data related to the ambient environment relative to the vehicle 100 in order to enhance one or more of the object and road infrastructure detection module 130, the object tracking module 140, the object classification module 150, the sensor module 180, and the vehicle systems 190. In one or more example embodiments, such a neural network may include, but is not limited to, a YOLO neural network.

In accordance with one or more embodiments, the ML system 160 may also acquire information from one or more other vehicles and process the received information to dynamically determine patterns in the ambient environment. Information may be received based on preferences including location (e.g., as defined by geography from address, zip code, or GPS coordinates), planned travel routes (e.g., GPS alerts), activity associated with co-owned/shared vehicles, history, news feeds, and the like. The information (i.e., received/acquired or processed information) may also be uplinked to other systems and modules in the vehicle 100 for further processing to discover additional information that may be used to enhance the understanding of the information. The ML system 160 may also transmit information to other vehicles, and link to other electronic devices, including but not limited to smart phones, smart home systems, or Internet-of-Things (IoT) devices. The ML system 160 may thereby communicate with/to other vehicles and or pedestrians.

In accordance with one or more embodiments, the ML system 160 may comprise one or more processors, and one or more data stores (e.g., non-volatile memory/NVM and/or volatile memory) containing a set of instructions, which when executed by the one or more processors, cause the ML system 160 to acquire information from one or more of other vehicles, the one or more processors 111, the one or more data stores 170, the sensor module 180, the vehicle system, 110, and any other input/output sources, and process the acquired information to, inter alia, cause implementation of one or more driving maneuvers for purposes of collision avoidance. Embodiments, however, are not limited thereto, and thus, the ML system 160 may process the acquired information to do other aspects related to operation of the vehicle 100. The ML system 160 may communicate with and collect information from one or more of other vehicles, the one or more processors 111, the one or more data stores 170, the sensor module 180, the vehicle systems 110, and any other input/output sources to provide a deeper understanding of the monitored activities of the systems, components, and interfaces.

In accordance with one or more embodiment, the vehicle 100 may comprise one or more vehicle systems 190 and subsystems, such as, for example, a drive train system, a braking system, a steering system, a throttle system, a transmission system, a signaling system, a navigation system, a lighting system, a horn system. Embodiments, however, are not limited thereto, and thus, the vehicle 100 may comprise more, fewer, or different systems and subsystems. The control module/ECU 110 are operatively connected to communicate with the various vehicle systems 190 and/or individual components thereof.

The navigation system may comprise one or more mechanisms, devices, elements, components, systems, applications and/or combinations thereof (now known or later developed), configured to determine the geographic location of the vehicle 100 and/or to determine a travel route for the vehicle 100. The navigation system may comprise one or more mapping applications to determine the travel route for the vehicle 100. For instance, a user, operator (including remote operator), driver, or passenger may input, via the input interface of the I/O hub 120, an origin and a destination of the vehicle 100. The mapping application can then determine one or more suitable travel routes between the origin and the destination. A travel route may be selected based on one or more parameters (e.g. shortest travel distance, shortest amount of travel time, etc.).

In accordance with one or more embodiments, the navigation system may be configured to update the travel route dynamically while the vehicle 100 is in operation. In one or more example embodiments, the navigation system may dynamically update the travel route of the vehicle 100, in response to executing measurable attribute data analysis of the sensor data 501, stored data 502, and wireless network data 503. The navigation system may comprise one or more of a global positioning system, a local positioning system, and a geolocation system. The navigation system may be implemented with any one of a plurality of satellite positioning systems, such as the United States Global Positioning System (GPS), the Russian Glonass system, the European Galileo system, the Chinese Beidou system, the Chinese COMPASS system, the Indian Regional Navigational Satellite System, or any system that uses satellites from a combination of satellite systems, or any satellite system developed in the future. The navigation system may use Transmission Control Protocol (TCP) and/or a Geographic information system (GIS) and location services.

The navigation system may comprise a transceiver configured to estimate a position of the vehicle 100 with respect to the Earth. For example, the navigation system may comprise a GPS transceiver to determine the latitude, longitude, and/or altitude of the vehicle 100. The navigation system may use other systems (e.g. laser-based localization systems, inertial-aided GPS, and/or camera-based localization) to determine the location of the vehicle 100. Alternatively or additionally, the navigation system may be based on access point geolocation services, such as using the W3C Geolocation Application Programming Interface (API). With such a system, the location of the vehicle 100 may be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. It will be understood, therefore, that the specific manner in which the geographic position of the vehicle 100 is determined will depend on the manner of operation of the particular location tracking system used.

As illustrated in FIGS. 2 through 5, during operation of the vehicle 100, the user, operator (including remote operator), or driver of the vehicle 100 may input a user-selected predetermined threshold distance Dt1, Dt2, Dt3 for detection by the sensor module 180 of a presence of one or more objects and one or more road infrastructures in the ambient environment. This user-selected input data is then stored in memory as stored data 502. The detected objects may include, but are not limited to, objects that are spatially on, above, and/or over the roadway path, e.g., animals, tires, debris, rocks, and pedestrians. The detected road infrastructure elements may include, but are not limited to, fixed/stationary physical assets, such as the actual roadway surface, signage, drainage, bridges, parking curbs, etc.

The sensor module 150 is also automatically caused to dynamically detect, determine, assess, monitor, measure, quantify, and/or sense one or more measurable attributes of detected objects and detected road infrastructure elements in the ambient environment. The one or more measurable attributes of the detected road infrastructure element include any physical characteristics of the detected object(s) and detected road infrastructure element(s). Such physical characteristics includes, but is not limited to, the length, height, width, and shape.

The control module/ECU 110 is operable to dynamically acquire one or more data input signals 500 that comprises detected measurable attribute data 501 of the objects and road infrastructure elements, any stored data 502, and also any wireless network data 503 that are related to one or more of the current ambient environment, the detected object(s), and the detected road infrastructure element(s).

In response thereto, the control module/ECU 110 is operable to dynamically execute a measurable attribute data analysis 510 of the input signals 500 associated with the one or more detected measurable attributes. The measurable attribute data analysis 510 comprises executing a comparison of the detected measurable attribute data 501 with a predetermined threshold value. For example, the control module/ECU 110 may execute a comparison of the detected relative height $H_{RIE}$ of the detected road infrastructure element (relative to the road surface RS upon which the vehicle 100 is operating) with a predetermined threshold height $H_{th}$. The predetermined threshold height $H_{th}$ may correspond to a vehicle height value acquired from vehicle specification data that is stored in memory. The predetermined threshold height $H_{th}$ may alternatively correspond to a vehicle ground clearance value acquired from vehicle specification data that is stored in memory. The ground clearance can be located at a front region (e.g., front bumper or front spoiler) of the body of the vehicle 100 and/or a rear region (e.g., rear bumper or rear spoiler) of the body of the vehicle 100.

In response to executing the measurable attribute data analysis 510, the control module/ECU 110 is operable to transmit one or more output control signals 520, and particular, one or more output control signals 521 to one or more systems, subsystems, components of the vehicle systems 190 to automatically control the vehicle 100 for purposes of collision avoidance with the detected object(s) or detected road infrastructure element(s).

For example, should the detected road infrastructure element comprise an overhead road infrastructure element $RIE_{oh}$, automatic control of the vehicle 100 comprises causing the vehicle 100 to execute one or more vehicle driving maneuvers to avoid contact with the overhead road infrastructure element $RIE_{oh}$ when the detected relative height $H_{RIE}$ of the overhead road infrastructure element $RIE_{oh}$ is less than the predetermined threshold height $H_{th}$, i.e., the vehicle height. The one or more vehicle driving maneuvers may include, but are not limited to, controlling the steering wheel of the vehicle, applying the vehicle brakes, and decelerating the vehicle 100.

Alternatively or additionally to executing automatic control of the vehicle 100, the control module/ECU 110 is operable to warn the user, operator (including remote operator), or driver by automatically transmitting one or more of a visual alarm, an audio alarm, and a haptic alarm.

Should, on the other hand, execution of the comparison reveals or otherwise determines that the detected relative height $H_{RIE}$ of the overhead road infrastructure element $RIE_{oh}$ is greater than the predetermined threshold height $H_{th}$, the control module/ECU 110 will enable normal operation of the vehicle 100. Meaning, should the comparison reveal there is sufficient clearance for the vehicle 100 to not cause contact with the overhead road infrastructure element $RIE_{oh}$, operation of the vehicle 100 will proceed as normal.

In another example, should the detected road infrastructure element comprise an on-ground road infrastructure element $RIE_{og}$, automatic control of the vehicle 100 comprises causing the vehicle 100 to execute one or more vehicle driving maneuvers to avoid contact with the on-ground road infrastructure element $RIE_{og}$ when the detected relative height $H_{RIE}$ of the on-ground road infrastructure element $RIE_{og}$ is greater than the predetermined threshold height $H_{th}$, i.e., the ground clearance of the vehicle 100. The one or more vehicle driving maneuvers may include, but are not limited to, controlling the steering wheel of the vehicle, applying the vehicle brakes, and decelerating the vehicle 100.

Alternatively or additionally to executing automatic control of the vehicle 100, the control module/ECU 110 is operable to warn the user, operator (including remote operator), or driver by automatically transmitting one or more of a visual alarm, an audio alarm, and a haptic alarm.

Should, on the other hand, execution of the comparison reveals or otherwise determines that the detected relative height $H_{RIE}$ of the on-ground road infrastructure element $RIE_{og}$ is less than the predetermined threshold height $H_{th}$, the control module/ECU 110 will enable normal operation of the vehicle 100. Meaning, should the comparison reveal there is sufficient clearance for the vehicle 100 to not cause contact with the on-ground road infrastructure element $RIE_{og}$, operation of the vehicle 100 will proceed as normal.

In accordance with one or more embodiments, the control module/ECU 110 is operable to store the detected measurable attribute data in memory. The sensor data 501, stored data 502 (which may include the sensor data 501), and the wireless network data 503 may be used to train a machine learning model of the machine learning system 160. The control module/ECU 110 is then operable to dynamically predict, via the trained machine learning model, a probability of contact between the vehicle and the detected road infrastructure element.

Illustrated examples shown in FIGS. 6 to 11 set forth example computer-implemented methods 600, 700, 800, 900, 1000, and 1100 for operating a vehicle. The respective flowcharts of the example computer-implemented methods 600, 700, 800, 900, 1000, and 1100 may be implemented by the one or more processors 111 of the ECU/Control module 110. In particular, the example computer-implemented methods 600, 700, 800, 900, 1000, and 1100 may be implemented as one or more modules in a set of logic instructions stored in a non-transitory machine or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

In the example computer-implemented methods 600, 700, 800, 900, 1000, and 1100, software executed by the ECU/Control module 111 provides functionality described or illustrated herein. In particular, software executed by the one or more processors 111 of the ECU/Control module 110 is configured to perform one or more processing blocks of the example computer-implemented methods 600, 700, 800, 900, 1000, and 1100 set forth, described, and/or illustrated herein, or provides functionality set forth, described, and/or illustrated.

Figure 6:
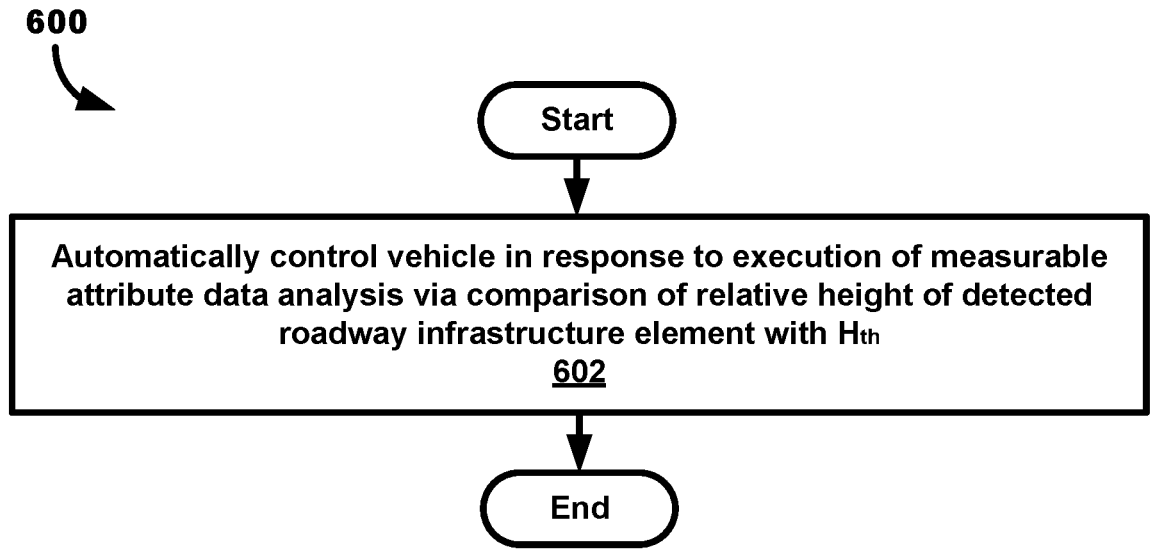
FIGS. 6 through 11 illustrate flowcharts of one or more example methods of operating the vehicle of FIG. 1.

In the illustrated example embodiment of FIG. 6, illustrated process block 602 includes automatically controlling a vehicle in response to dynamically executing measurable attribute data analysis by comparing the relative height of a detected road infrastructure element with a predetermined threshold height.

In accordance with process block 602, the detected road infrastructure element comprises fixed/stationary, physical assets, including but not limited to, the roadway surface, signage, drainage, bridges, parking curbs, etc.

In accordance with process block 602, the one or more measurable attributes of the detected road infrastructure element is the length, height, width, and shape of the detected road infrastructure element.

In accordance with process block 602, dynamically executing the measurable attribute data analysis comprises executing a calculation of a current surface area of the detected road infrastructure element.

In accordance with process block 602, the predetermined threshold height corresponds to the vehicle height.

In accordance with process block 602, the detected road infrastructure element comprises an overhead road infrastructure element.

In accordance with process block 602, the detected road infrastructure element comprises an on-ground road infrastructure element.

In accordance with process block 602, automatically controlling the vehicle comprises causing the vehicle to execute one or more vehicle driving maneuvers to avoid contact with the overhead road infrastructure element when the relative height of the overhead road infrastructure element is less than the vehicle height.

In accordance with process block 602, automatically controlling the vehicle comprises causing the vehicle to execute one or more vehicle driving maneuvers to avoid contact with the on-ground road infrastructure element when the relative height of the on-ground road infrastructure element is greater than the vehicle ground clearance.

In accordance with process block 602, the predetermined threshold height corresponds to the vehicle ground clearance. The ground clearance can be at a front region (e.g., front bumper or front spoiler) of the vehicle body and/or a rear region (e.g., rear bumper or rear spoiler) of the vehicle body.

In accordance with process block 602, the detected road infrastructure element comprises an on-ground road infrastructure element.

In accordance with process block 602, automatically controlling the vehicle comprises causing the vehicle to execute one or more vehicle driving maneuvers to avoid contact with the on-ground road infrastructure element when the relative height of the on-ground road infrastructure element is greater than the vehicle ground clearance.

In accordance with process block 602, the one or more vehicle driving maneuvers comprises controlling the steering wheel of the vehicle.

In accordance with process block 602, the one or more vehicle driving maneuvers comprises applying the vehicle brakes.

In accordance with process block 602, the one or more vehicle driving maneuvers comprises decelerating the vehicle.

The computer-implemented method 600 can terminate or end after execution of illustrated process block 602.

Figure 7:
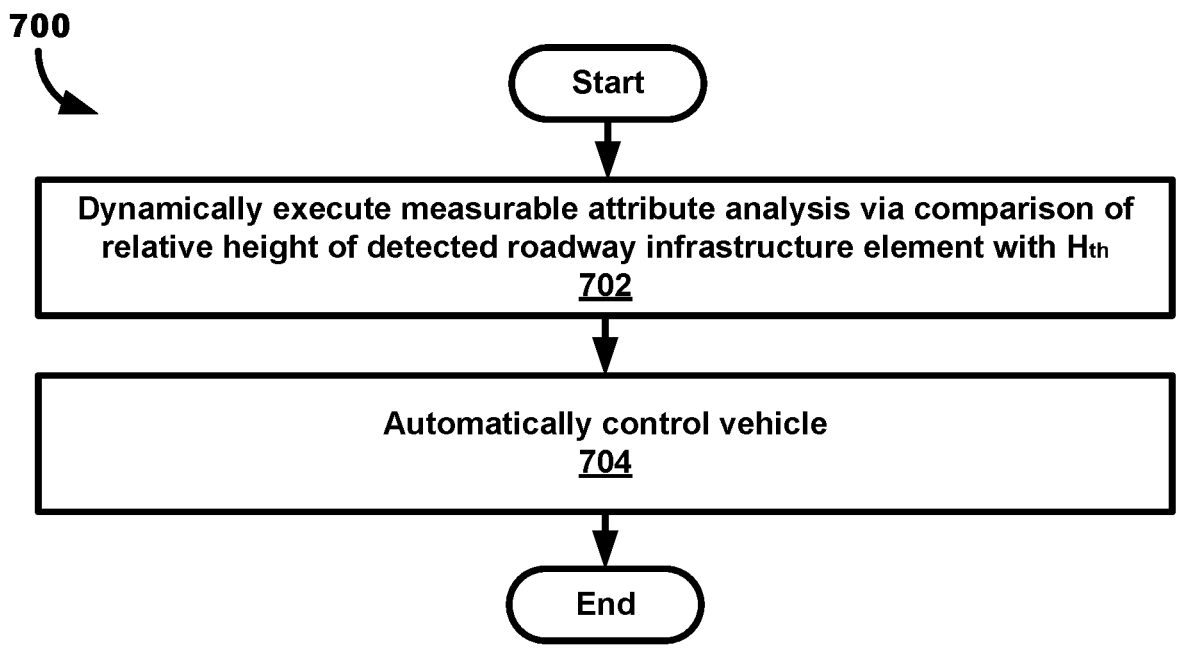

In the illustrated example embodiment of FIG. 7, illustrated process block 702 includes dynamically executing measurable attribute data analysis of acquired one or more measurable attributes of the detected road infrastructure element, stored data, and wireless network data, via a comparison of the relative height of a detected road infrastructure element with a predetermined threshold height.

In accordance with process block 702, the detected road infrastructure element comprises fixed/stationary, physical assets, including but not limited to, the roadway surface, signage, drainage, bridges, parking curbs, etc.

In accordance with process block 702, the one or more measurable attributes of the detected road infrastructure element is the length, height, width, and shape of the detected road infrastructure element.

In accordance with process block 702, dynamically executing the measurable attribute data analysis comprises executing a calculation of a current surface area of the detected road infrastructure element.

In accordance with process block 702, the predetermined threshold height corresponds to the vehicle height.

In accordance with process block 702, the detected road infrastructure element comprises an overhead road infrastructure element.

In accordance with process block 702, the detected road infrastructure element comprises an on-ground road infrastructure element.

The computer-implemented method 700 may then proceed to illustrated process block 704, which includes automatically controlling the vehicle in response to executing measurable attribute data analysis.

In accordance with process block 704, automatically controlling the vehicle comprises causing the vehicle to execute one or more vehicle driving maneuvers to avoid contact with the overhead road infrastructure element when the relative height of the overhead road infrastructure element is less than the vehicle height.

In accordance with process block 704, automatically controlling the vehicle comprises causing the vehicle to execute one or more vehicle driving maneuvers to avoid contact with the on-ground road infrastructure element when the relative height of the on-ground road infrastructure element is greater than the vehicle ground clearance.

In accordance with process block 704, the one or more vehicle driving maneuvers comprises controlling the steering wheel of the vehicle.

In accordance with process block 704, the one or more vehicle driving maneuvers comprises applying the vehicle brakes.

In accordance with process block 704, the one or more vehicle driving maneuvers comprises decelerating the vehicle.

The computer-implemented method 700 can terminate or end after execution of illustrated process block 704.

Figure 8:
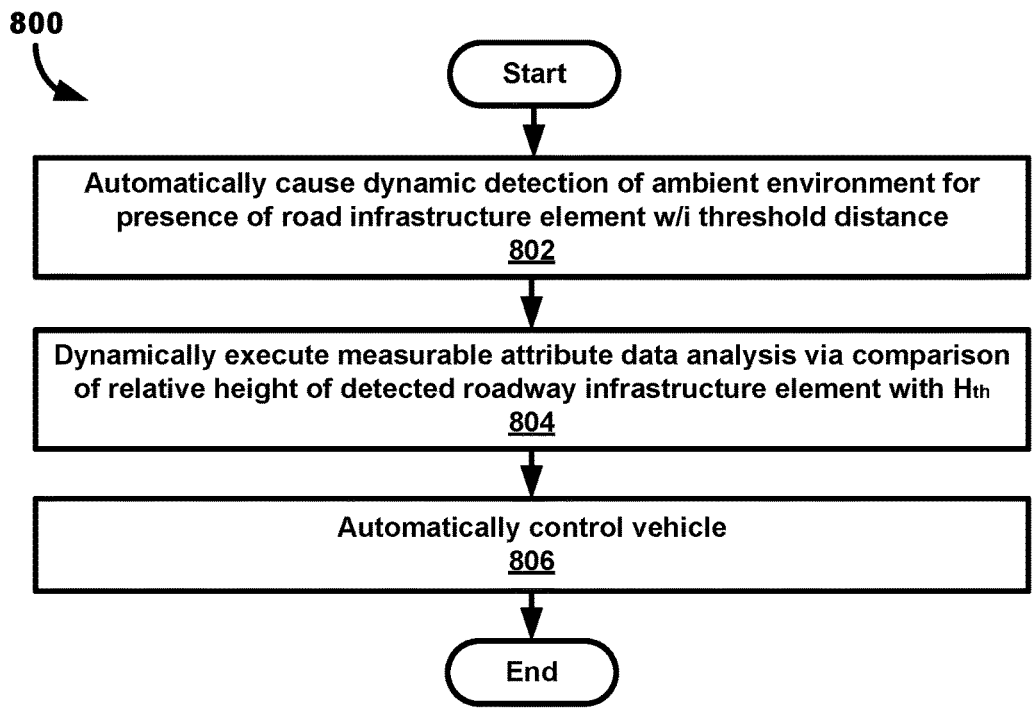

In the illustrated example embodiment of FIG. 8, illustrated process block 802 includes automatically causing a dynamic detection of, in an ambient environment of the vehicle, a presence of a road infrastructure element within a predetermined threshold distance of the vehicle.

In accordance with process block 802, the detected road infrastructure element comprises fixed/stationary, physical assets, including but not limited to, the roadway surface, signage, drainage, bridges, parking curbs, etc.

In accordance with process block 802, the detected road infrastructure element comprises an overhead road infrastructure element.

In accordance with process block 802, the detected road infrastructure element comprises an on-ground road infrastructure element.

The computer-implemented method 800 may then proceed to illustrated process block 804, which includes dynamically executing measurable attribute data analysis of acquired one or more measurable attributes of the detected road infrastructure element, stored data, and wireless network data, via a comparison of the relative height of a detected road infrastructure element with a predetermined threshold height.

In accordance with process block 804, the one or more measurable attributes of the detected road infrastructure element is the length, height, width, and shape of the detected road infrastructure element.

In accordance with process block 804, dynamically executing the measurable attribute data analysis comprises executing a calculation of a current surface area of the detected road infrastructure element.

In accordance with process block 804, the predetermined threshold height corresponds to the vehicle height.

In accordance with process block 804, the detected road infrastructure element comprises an overhead road infrastructure element.

The computer-implemented method 800 may then proceed to illustrated process block 806, which includes automatically controlling the vehicle in response to executing measurable attribute data analysis.

In accordance with process block 806, automatically controlling the vehicle comprises causing the vehicle to execute one or more vehicle driving maneuvers to avoid contact with the overhead road infrastructure element when the relative height of the overhead road infrastructure element is less than the vehicle height.

In accordance with process block 806, automatically controlling the vehicle comprises causing the vehicle to execute one or more vehicle driving maneuvers to avoid contact with an on-ground road infrastructure element when the relative height of the on-ground road infrastructure element is greater than the vehicle ground clearance.

In accordance with process block 806, the one or more vehicle driving maneuvers comprises controlling the steering wheel of the vehicle.

In accordance with process block 806, the one or more vehicle driving maneuvers comprises applying the vehicle brakes.

In accordance with process block 806, the one or more vehicle driving maneuvers comprises decelerating the vehicle.

The computer-implemented method 800 can terminate or end after execution of illustrated process block 806.

Figure 9:
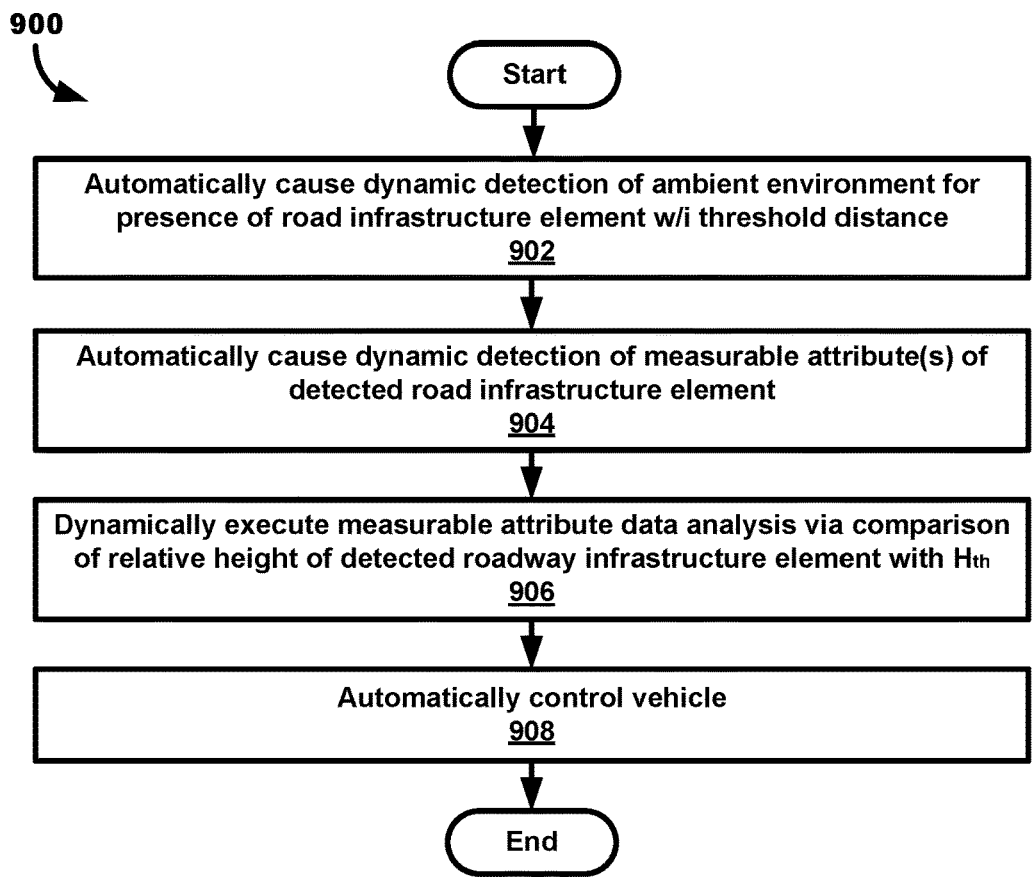

In the illustrated example embodiment of FIG. 9, illustrated process block 902 includes automatically causing a dynamic detection of, in an ambient environment of the vehicle, a presence of a road infrastructure element within a predetermined threshold distance of the vehicle.

In accordance with process block 902, the detected road infrastructure element comprises fixed/stationary, physical assets, including but not limited to, the roadway surface, signage, drainage, bridges, parking curbs, etc.

In accordance with process block 902, the detected road infrastructure element comprises an overhead road infrastructure element.

In accordance with process block 902, the detected road infrastructure element comprises an on-ground road infrastructure element.

The computer-implemented method 900 may then proceed to illustrated process block 904, which includes automatically causing dynamic detection of one or more measurable attributes of the detected road infrastructure element.

In accordance with process block 904, the one or more measurable attributes of the detected road infrastructure element is the length, height, width, and shape of the detected road infrastructure element.

The computer-implemented method 900 may then proceed to illustrated process block 906, which includes dynamically executing measurable attribute data analysis of acquired one or more measurable attributes of the detected road infrastructure element, stored data, and wireless network data, via a comparison of the relative height of a detected road infrastructure element with a predetermined threshold height.

In accordance with process block 906, dynamically executing the measurable attribute data analysis comprises executing a calculation of a current surface area of the detected road infrastructure element.

In accordance with process block 906, the predetermined threshold height corresponds to the vehicle height.

In accordance with process block 906, the detected road infrastructure element comprises an overhead road infrastructure element.

The computer-implemented method 900 may then proceed to illustrated process block 908, which includes automatically controlling the vehicle in response to executing measurable attribute data analysis.

In accordance with process block 908, automatically controlling the vehicle comprises causing the vehicle to execute one or more vehicle driving maneuvers to avoid contact with the overhead road infrastructure element when the relative height of the overhead road infrastructure element is less than the vehicle height.

In accordance with process block 908, automatically controlling the vehicle comprises causing the vehicle to execute one or more vehicle driving maneuvers to avoid contact with an on-ground road infrastructure element when the relative height of the on-ground road infrastructure element is greater than the vehicle ground clearance.

In accordance with process block 908, the one or more vehicle driving maneuvers comprises controlling the steering wheel of the vehicle.

In accordance with process block 908, the one or more vehicle driving maneuvers comprises applying the vehicle brakes.

In accordance with process block 908, the one or more vehicle driving maneuvers comprises decelerating the vehicle.

The computer-implemented method 900 can terminate or end after execution of illustrated process block 908.

Figure 10:
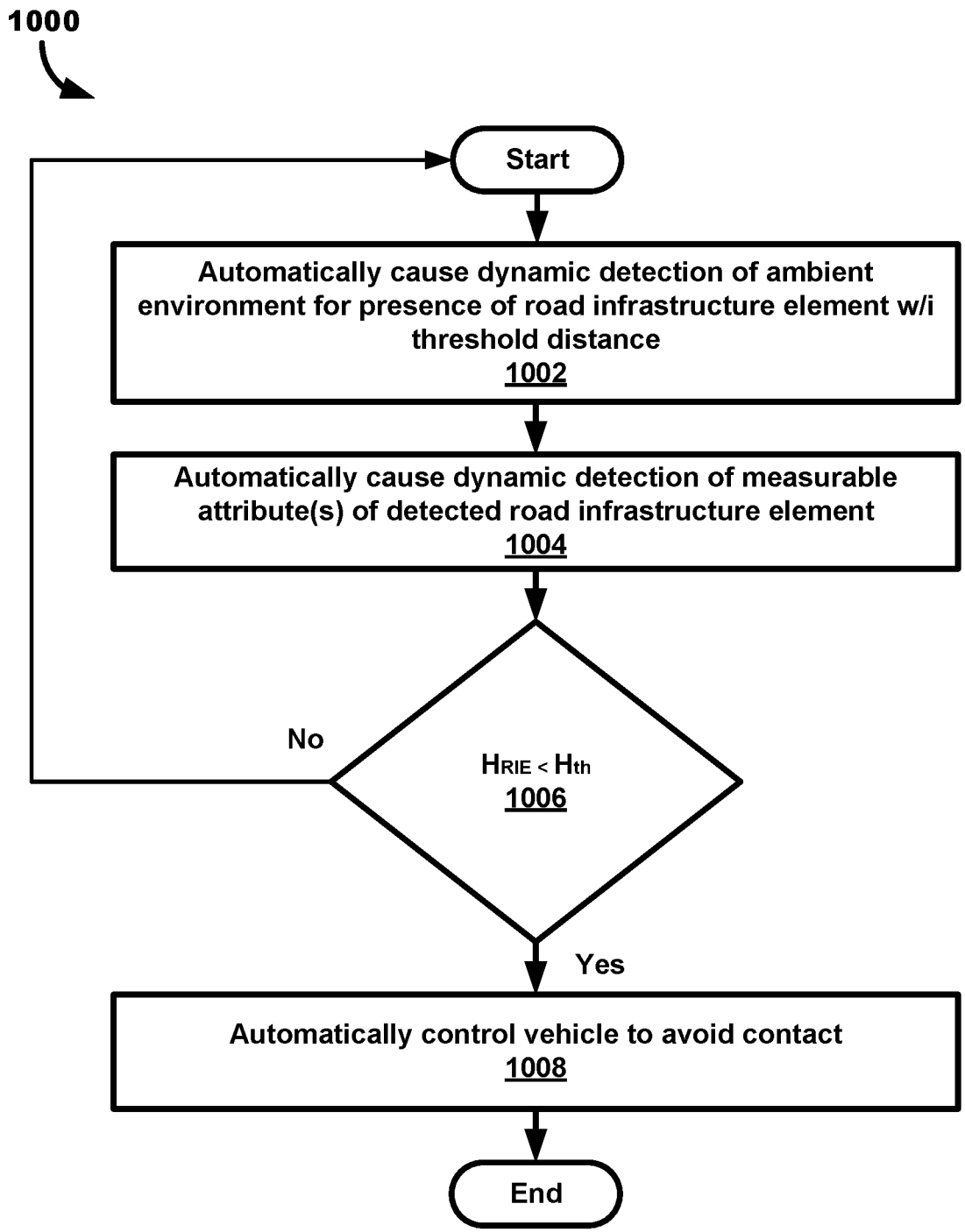

In the illustrated example embodiment of FIG. 10, illustrated process block 1002 includes automatically causing a dynamic detection of, in an ambient environment of the vehicle, a presence of a road infrastructure element within a predetermined threshold distance of the vehicle.

In accordance with process block 1002, the detected road infrastructure element comprises fixed/stationary, physical assets, including but not limited to, the roadway surface, signage, drainage, bridges, parking curbs, etc.

In accordance with process block 1002, the detected road infrastructure element comprises an overhead road infrastructure element.

In accordance with process block 1002, the detected road infrastructure element comprises an on-ground road infrastructure element.

The computer-implemented method 1000 may then proceed to illustrated process block 1004, which includes automatically causing dynamic detection of one or more measurable attributes of the detected road infrastructure element.

In accordance with process block 1004, the one or more measurable attributes of the detected road infrastructure element is the length, height, width, and shape of the detected road infrastructure element.

The computer-implemented method 1000 may then proceed to illustrated process block 1006, which includes dynamically executing measurable attribute data analysis of acquired one or more measurable attributes of the detected road infrastructure element, stored data, and wireless network data, via a comparison of the relative height of a detected road infrastructure element with a predetermined threshold height.

In accordance with process block 1006, the predetermined threshold height corresponds to the vehicle height.

In accordance with process block 1006, the detected road infrastructure element comprises an overhead road infrastructure element.

In accordance with process block 1006, dynamically executing the measurable attribute data analysis comprises executing a comparison of the detected relative height $H_{RIE}$ of the detected road infrastructure element (relative to the road surface RS upon which the vehicle 100 is operating) with a predetermined threshold height $H_{th}$. This disclosure contemplates utilizing an offset about the predetermined threshold height $H_{th}$ in order to provide a height hysteresis to reduce the amount of control cycling. Accordingly, a hysteresis threshold height value may be offset from the predetermined threshold height $H_{th}$ a certain amount (in inches, millimeters, etc.).

In accordance with process block 1006, the predetermined threshold height $H_{th}$ may correspond to a vehicle height value acquired from vehicle specification data that is stored in memory.

In accordance with process block 1006, the predetermined threshold height $H_{th}$ may correspond to a vehicle ground clearance value acquired from vehicle specification data that is stored in memory. The ground clearance can be located at a front region (e.g., front bumper or front spoiler) of the body of the vehicle 100 and/or a rear region (e.g., rear bumper or rear spoiler) of the body of the vehicle 100.

If "No," i.e., should the comparison conclude the detected relative height $H_{RIE}$ of the detected road infrastructure element is greater than the predetermined threshold height $H_{th}$, the method 1000 then returns to start.

If "Yes," i.e., should the comparison conclude the detected relative height $H_{RIE}$ is less than the predetermined threshold height $H_{th}$ (i.e., the vehicle height when the detected road infrastructure element is an overhead road infrastructure element) or greater than the predetermined threshold height $H_{th}$ (i.e., the ground clearance of the vehicle when the detected road infrastructure element is an on-ground road infrastructure element), the method 1000 then proceeds to process block 1008, which includes automatically controlling the vehicle.

In accordance with process block 1008, automatically controlling the vehicle comprises causing the vehicle to execute one or more vehicle driving maneuvers to avoid contact with the road infrastructure element.

In accordance with process block 1008, the one or more vehicle driving maneuvers comprises controlling the steering wheel of the vehicle.

In accordance with process block 1008, the one or more vehicle driving maneuvers comprises applying the vehicle brakes.

In accordance with process block 1008, the one or more vehicle driving maneuvers comprises decelerating the vehicle.

The computer-implemented method 1000 can terminate or end after execution of illustrated process block 1008.

Figure 11:
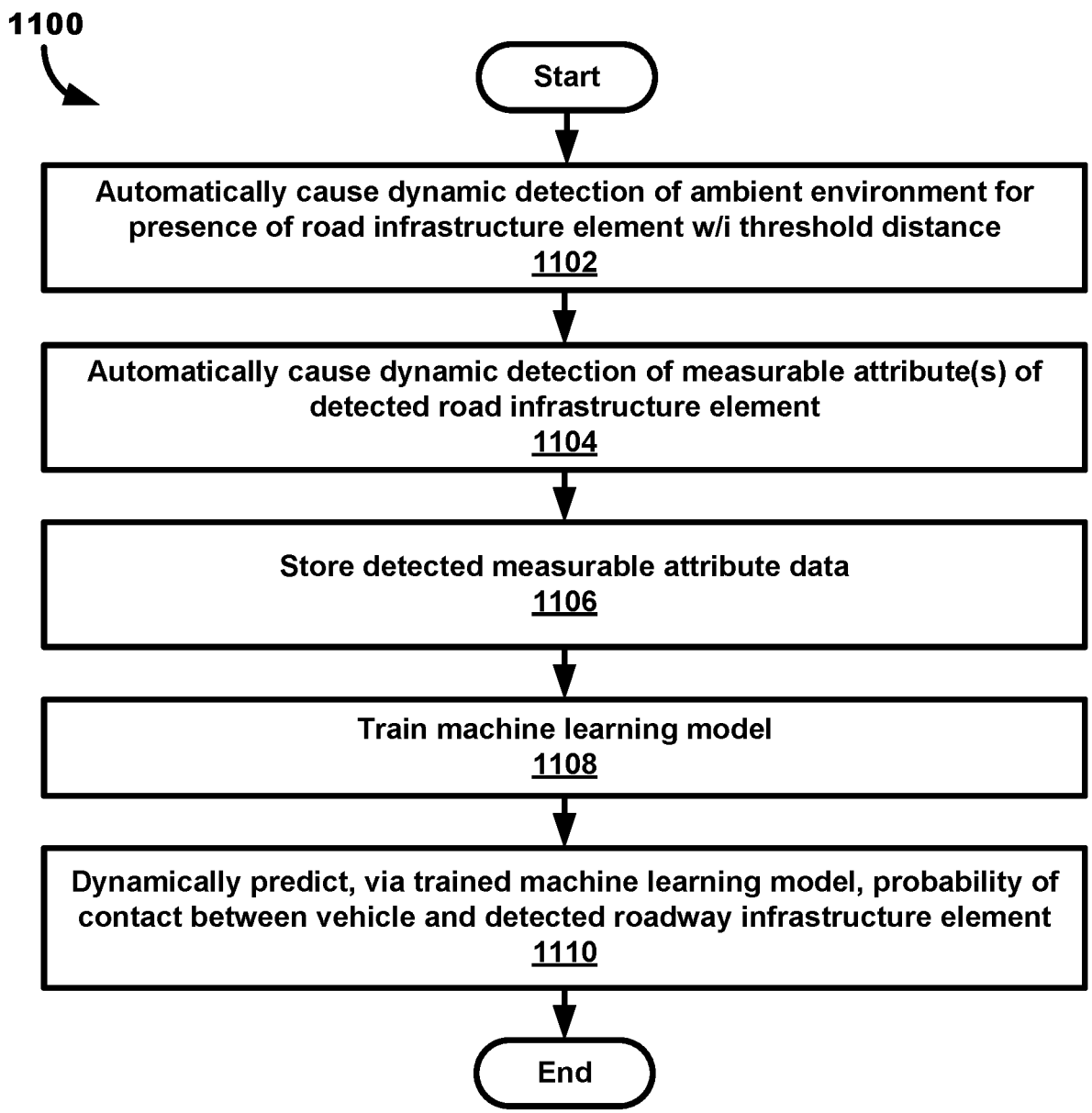

In the illustrated example embodiment of FIG. 11, illustrated process block 1102 includes automatically causing a dynamic detection of, in an ambient environment of the vehicle, a presence of a road infrastructure element within a predetermined threshold distance of the vehicle.

In accordance with process block 1102, the detected road infrastructure element comprises fixed/stationary, physical assets, including but not limited to, the roadway surface, signage, drainage, bridges, parking curbs, etc.

In accordance with process block 1102, the detected road infrastructure element comprises an overhead road infrastructure element.

In accordance with process block 1102, the detected road infrastructure element comprises an on-ground road infrastructure element.

The computer-implemented method 1100 may then proceed to illustrated process block 1104, which includes automatically causing dynamic detection of one or more measurable attributes of the detected road infrastructure element.

In accordance with process block 1104, the one or more measurable attributes of the detected road infrastructure element is the length, height, width, and shape of the detected road infrastructure element.

The computer-implemented method 1100 may then proceed to illustrated process block 1106, which includes storing the detected one or more measurable attributes of the detected road infrastructure element in memory.

The computer-implemented method 1100 may then proceed to illustrated process block 1108, which includes training a machine learning model based on the detected measurable attribute data, other stored data, wireless network data, and any other input sources (including external input resources).

The computer-implemented method 1100 may then proceed to illustrated process block 1110, which includes dynamically predicting, via the trained machine learning model, a probability of contact between the vehicle and the detected road infrastructure element.

The computer-implemented method 1100 can terminate or end after execution of illustrated process block 110.

The terms "coupled," "attached," or "connected" may be used herein to refer to any type of relationship, direct or indirect, between the components in question, and may apply to electrical, mechanical, fluid, optical, electromagnetic, electro-mechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the exemplary embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A vehicle system, comprising:
   one or more processors;
   a non-transitory memory operatively coupled to the one or more processors, the non-transitory memory storing a set of instructions executable by the one or more processors to cause the one or more processors to:
   dynamically execute, in response to acquiring wireless network data, stored data, and detected measurable attribute data that includes a relative height of a detected road infrastructure element relative to a roadway surface upon which the vehicle is traveling, a measurable attribute data analysis by comparing the relative height of the detected road infrastructure element with a predetermined threshold height; and
   automatically control the vehicle, in response to the measurable attribute data analysis, by causing the vehicle to execute one or more vehicle driving maneuvers to avoid contact with the detected road infrastructure element.

2. The vehicle system of claim 1, wherein prior to dynamically executing the measurable attribute data analysis, the set of instructions are executable by the one or more processors to cause the one or more processors to:
   automatically cause a dynamic detection of, in an ambient environment of the vehicle, a presence of the road infrastructure element within a predetermined threshold distance of the vehicle, and
   automatically cause a detection of one or more measurable attributes of the road infrastructure element as the measurable attribute sensor data.

3. The vehicle system of claim 1, wherein:
   the predetermined threshold height corresponds to the vehicle height, and
   the detected road infrastructure element comprises an overhead road infrastructure element.

4. The vehicle system of claim 3, wherein automatically controlling the vehicle comprises causing the vehicle to execute the one or more vehicle driving maneuvers to avoid contact with the overhead road infrastructure element when the relative height of the overhead road infrastructure element is less than the vehicle height.

5. The vehicle system of claim 1, wherein:
   the predetermined threshold height corresponds to the vehicle ground clearance, and the detected road infrastructure element comprises an on-ground road infrastructure element.

6. The vehicle system of claim 5, wherein automatically controlling the vehicle comprises causing the vehicle to execute the one or more vehicle driving maneuvers to avoid contact with the on-ground road infrastructure element when the relative height of the on-ground road infrastructure element is greater than the vehicle ground clearance.

7. The vehicle system of claim 1, wherein the set of instructions are executable by the one or more processors to cause the one or more processors to:
   store the detected measurable attribute data in memory,
   train, in response to storing the detected measurable attribute data, a machine learning model of the vehicle, and
   dynamically predict, via the trained machine learning model, a probability of contact between the vehicle and the detected road infrastructure element.

8. A computer-implemented method of operating a vehicle, the method comprising:
   dynamically executing, in response to acquiring wireless network data, stored data, and detected measurable attribute data that includes a relative height of a detected road infrastructure element relative to a roadway surface upon which the vehicle is traveling, a measurable attribute data analysis by comparing the relative height of the detected road infrastructure element with a predetermined threshold height; and
   automatically controlling the vehicle, in response to the measurable attribute data analysis, by causing the vehicle to execute one or more vehicle driving maneuvers to avoid contact with the detected road infrastructure element.

9. The computer-implemented method of claim 8, further comprising, prior to dynamically executing the measurable attribute data analysis:
   automatically causing a dynamic detection of, in an ambient environment of the vehicle, a presence of the road infrastructure element within a predetermined threshold distance of the vehicle; and
   automatically causing a detection of one or more measurable attributes of the road infrastructure element as the measurable attribute sensor data.

10. The computer-implemented method of claim 8, wherein:
    the predetermined threshold height corresponds to the vehicle height, and
    the detected road infrastructure element comprises an overhead road infrastructure element.

11. The computer-implemented method of claim 10, wherein automatically controlling the vehicle comprises causing the vehicle to execute the one or more vehicle driving maneuvers to avoid contact with the overhead road infrastructure element when the relative height of the overhead road infrastructure element is less than the vehicle height.

12. The computer-implemented method of claim 8, wherein:
    the predetermined threshold height corresponds to the vehicle ground clearance, and
    the detected road infrastructure element comprises an on-ground road infrastructure element.

13. The computer-implemented method of claim 12, wherein automatically controlling the vehicle comprises causing the vehicle to execute the one or more vehicle driving maneuvers to avoid contact with the on-ground road infrastructure element when the relative height of the on-ground road infrastructure element is greater than the vehicle ground clearance.

14. The computer-implemented method of claim 8, further comprising:
    storing the detected measurable attribute data in memory;
    training, in response to dynamically executing the measurable attribute data analysis, a machine learning model of the vehicle; and
    dynamically predicting, via the trained machine learning model, a probability of contact between the vehicle and the detected road infrastructure element.

15. A computer program product to operate a vehicle, the computer program product including at least one non-transitory computer readable medium, comprising a set of instructions, which when executed by one or more processors, cause the one or more processors to:
    dynamically execute, in response to acquiring wireless network data, stored data, and detected measurable attribute data that includes a relative height of a detected road infrastructure element relative to a roadway surface upon which the vehicle is traveling, and executing measurable attribute data analysis by comparing the relative height of the detected road infrastructure element with a predetermined threshold height; and
    automatically control the vehicle, in response to the measurable attribute data analysis, by causing the vehicle to execute one or more vehicle driving maneuvers to avoid contact with the detected road infrastructure element.

16. The computer program product of claim 15, wherein prior to dynamically executing the measurable attribute data analysis, the set of instructions are executable by the one or more processors to cause the one or more processors to:
    automatically cause a dynamic detection of, in an ambient environment of the vehicle, a presence of the road infrastructure element within a predetermined threshold distance of the vehicle, and
    automatically cause a detection of one or more measurable attributes of the road infrastructure element as the measurable attribute sensor data.

17. The computer program product of claim 15, wherein:
    the predetermined threshold height corresponds to the vehicle height, and
    the detected road infrastructure element comprises an overhead road infrastructure element.

18. The computer program product of claim 17, wherein automatically controlling the vehicle comprises causing the vehicle to execute the one or more vehicle driving maneuvers to avoid contact with the overhead road infrastructure element when the relative height of the overhead road infrastructure element is less than the vehicle height.

19. The computer program product of claim 15, wherein:
    the predetermined threshold height corresponds to the vehicle ground clearance, and
    the detected road infrastructure element comprises an on-ground road infrastructure element.

20. The computer program product of claim 19, wherein automatically controlling the vehicle comprises causing the vehicle to execute the one or more vehicle driving maneuvers to avoid contact with the on-ground road infrastructure element when the relative height of the on-ground road infrastructure element is greater than the vehicle ground clearance.

21. The computer program product of claim 15, wherein the set of instructions are executable by the one or more processors to cause the one or more processors to:
- store the detected measurable attribute data in memory,
- train, in response to storing the detected measurable attribute data, a machine learning model of the vehicle, and
- dynamically predict, via the trained machine learning model, a probability of contact between the vehicle and the detected road infrastructure element.

* * * * *